(12) United States Patent
Liu et al.

(10) Patent No.: US 12,512,958 B2
(45) Date of Patent: Dec. 30, 2025

(54) PHASE TRACKING AND CORRECTION ARCHITECTURE

(71) Applicant: QUALCOMM Incorporated, San Diego, CA (US)

(72) Inventors: Gang Liu, San Diego, CA (US);
Xiaotie Wu, San Diego, CA (US);
Razak Hossain, San Diego, CA (US);
Marco Zanuso, Encinitas, CA (US);
Yiwu Tang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 17/935,052

(22) Filed: Sep. 23, 2022

(65) Prior Publication Data

US 2024/0106623 A1 Mar. 28, 2024

(51) Int. Cl.
*H04L 7/033* (2006.01)
*H03L 7/08* (2006.01)
*H04L 7/00* (2006.01)
*H04L 7/04* (2006.01)

(52) U.S. Cl.
CPC ............. *H04L 7/033* (2013.01); *H03L 7/08* (2013.01); *H04L 7/0033* (2013.01); *H04L 7/044* (2013.01)

(58) Field of Classification Search
CPC . H03L 7/06; H03L 7/08; H03L 7/0805; H03L 7/087; H03L 7/091; H03L 7/099; H03L 7/0991; H03L 7/0992; H03L 7/0994; H04L 7/00; H04L 7/0033; H04L 7/0037; H04L 7/0041; H04L 7/0274; H04L 7/033; H04L 7/0331; H04L 7/044; H04L 7/10

USPC ........ 375/247, 326–328, 362, 369, 373–376; 327/91, 93–95, 155–162; 341/122, 143
See application file for complete search history.

(56) References Cited

U.S. PATENT DOCUMENTS

| | | | | |
|---|---|---|---|---|
| 6,275,544 | B1 * | 8/2001 | Aiello | H04L 27/066 375/326 |
| 8,384,452 | B1 * | 2/2013 | Parker | H03L 7/235 327/147 |
| 9,941,889 | B1 * | 4/2018 | Guo | H03L 7/23 |
| 10,516,403 | B1 * | 12/2019 | Aouini | H03L 7/093 |
| 2003/0034846 | A1 * | 2/2003 | Fan | H03L 7/1072 331/25 |
| 2009/0251225 | A1 * | 10/2009 | Chen | H03K 3/03 331/25 |

(Continued)

FOREIGN PATENT DOCUMENTS

EP 3567728 A1 11/2019

OTHER PUBLICATIONS

International Search Report and Written Opinion—PCT/US2023/074191—ISA/EPO—Jan. 9, 2024.

*Primary Examiner* — Young T. Tse
(74) *Attorney, Agent, or Firm* — Polsinelli/Qualcomm Incorporated

(57) ABSTRACT

Aspects described herein include devices and methods for phase tracking and correction using sampling. One aspect includes a wireless communication apparatus having an analog 1-bit sampler configured to sample a phase locked loop (PLL) output signal using a PLL reference clock to generate 1-bit samples and a digital phase computation and control circuit configured to receive the 1-bit samples from the analog 1-bit sampler and apply phase corrections to the PLL based on a phase error derived from the 1-bit samples.

28 Claims, 15 Drawing Sheets

(56) References Cited

U.S. PATENT DOCUMENTS

| | | |
|---|---|---|
| 2017/0324419 A1* | 11/2017 | Mayer .................... H03L 7/0891 |
| 2020/0066968 A1* | 2/2020 | Park ........................ H10N 50/85 |
| 2020/0132764 A1* | 4/2020 | Chou ............... G01R 31/31724 |
| 2021/0021402 A1 | 1/2021 | Sridharan et al. |
| 2021/0044472 A1 | 2/2021 | Dorosenco et al. |
| 2022/0060191 A1* | 2/2022 | Roodnat ................. H03L 7/091 |
| 2022/0393690 A1* | 12/2022 | Banin .................... H03L 7/081 |

* cited by examiner

PHASE TRACKING AND CORRECTION ARCHITECTURE

FIELD

The present disclosure relates generally to electronics and wireless communications. For example, aspects of the present disclosure relate to tracking and correction of low frequency phase drift.

BACKGROUND

Wireless communication devices and technologies are becoming ever more prevalent. Wireless communication devices generally transmit and receive communication signals. A communication signal is typically processed by a variety of different components and circuits. In some modern communication systems, phase array antennas are used to improve system operation with improved link budgets, system capacity, beamforming, multiple-in multiple-out (MIMO) communications, and other such system operation. Supporting one or more of such systems can involve complex system design choices, and managing complex interactions among device elements and signals.

SUMMARY

Various implementations of systems, methods, and devices within the scope of the appended claims each have several aspects, no single one of which is solely responsible for the desirable attributes described herein. Without limiting the scope of the appended claims, some prominent features are described herein.

Disclosed are systems, apparatuses, methods, computer readable medium, and circuits for phase tracking and correction. According to at least one example, a communication apparatus for phase detection and correction includes: an analog 1-bit sampler configured to sample a phase locked loop (PLL) output signal using a PLL reference clock to generate 1-bit samples; and a digital phase computation and control circuit configured to receive the 1-bit samples from the analog 1-bit sampler and apply phase corrections to the PLL based on a phase error. The apparatus may include a phase detection, correction, and tracking system comprising the analog 1-bit sampler and the digital phase computation and control circuit:

Some such aspects operate where the PLL output signal is sampled within a transmit signal path of the wireless communication apparatus prior to a local oscillator (LO) signal generator circuit. Some such aspects operate where the PLL output signal is sampled in a path between a voltage controlled oscillator and the LO signal generator circuit. Some such aspects operate where the PLL output signal is sampled from a portion of a receive path between receive PLL circuitry and local oscillator (LO) signal generator circuitry.

Some such aspects operate where the analog 1-bit sampler comprises: a signal buffer; T-switch circuitry; a voltage comparator having an input coupled to the signal buffer via the T-switch circuitry; and a PLL reference clock buffer for the PLL reference clock, the PLL reference clock buffer coupled to the T-switch circuitry, wherein the PLL reference clock buffer is configured to control the T-switch circuitry to hold a sample from the PLL output signal at the input at each cycle of the PLL reference clock via the signal buffer.

Some such aspects operate where the reference clock buffer is further used to control timing of a 1-bit output of the voltage comparator while the sample is held at the input of the voltage comparator.

Some such aspects further include a delay element coupled in a path used to control the timing of the 1-bit output of the voltage comparator. Some such aspects further include a signal buffer; a voltage comparator having an input coupled to the signal buffer; and a PLL reference clock buffer for the PLL reference clock, wherein the voltage comparator is coupled to the PLL reference clock buffer to clock the 1-bit samples of a signal from the signal buffer using the PLL reference clock from the PLL reference clock buffer.

Some such aspects further include the digital phase computation and control circuit having: a first digital phase accumulator; a second digital phase accumulator; and a sample input connected to an output of the analog 1-bit sampler.

Some such aspects operate where a single phase value is calculated using values from the first digital phase accumulator when values from the second digital phase accumulator are in a first dead zone associated with a 50% duty cycle state for the first digital phase accumulator; and the single phase value is calculated using the values from the second digital phase accumulator when the values from the first digital phase accumulator are in a second dead zone associated with the 50% duty cycle state for the second digital phase accumulator.

Some such aspects further operate where the digital phase computation and control circuit comprises circuitry configured to: compare the phase error to an error target; and generate a control signal associated with the phase error when the phase error is larger than the error target. Some such aspects further include delta sigma modulation circuitry, wherein an output of the digital phase computation and control circuit is coupled to the delta sigma modulation circuitry to provide the control signal to the delta sigma modulation circuitry.

Some such aspects further include digital divider circuitry having a first input coupled the PLL output; a second input coupled to the digital phase computation and control circuit; and an output configured to provide a feedback clock to an input of the PLL, wherein the feedback clock is selected at least in part by dividing the PLL output signal received from the PLL based on a control signal from the digital phase computation and control circuit in response to the phase drift error being greater than a threshold value.

According to at least one other example, a communication apparatus includes a signal path; an analog sampler coupled to the signal path at a detection position and configured to generate 1-bit phase samples of a signal on the signal path; phase sample circuitry having an input coupled to the signal path at the detection position and an output that indicates an average phase value over a calculation period; and determine a phase error value from the average phase value of the calculation period for each of a plurality of phase accumulators, compares the phase error value to a threshold value, and generates a control signal when the phase error value is greater than the threshold value.

According to at least one other example, a method includes: determining a phase error threshold; calculating a phase error value using a plurality of 1-bit samples from an analog sampler and digital circuitry, wherein the analog sampler and digital circuitry are coupled to an output of phase lock loop (PLL) circuitry and a reference clock network of a wireless communication device; and applying a phase correction to the PLL circuitry based on an output of the digital circuitry.

In another example, a communication apparatus for phase tracking and correction is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the communication apparatus to: determine a phase error threshold; calculate a phase error value using a plurality of 1-bit samples from an analog sampler and digital circuitry, wherein the analog sampler and digital circuitry are coupled to an output of phase lock loop (PLL) circuitry and a reference clock network of a wireless communication device; and apply a phase correction to the PLL circuitry based on an output of the digital circuitry.

In another example, a communication apparatus for phase tracking and correction includes means for sampling a phase locked loop output signal, and means for applying phase corrections based on a phase error generated from the sampling.

The foregoing, together with other features and embodiments, will become more apparent upon referring to the following specification, claims, and accompanying drawings.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
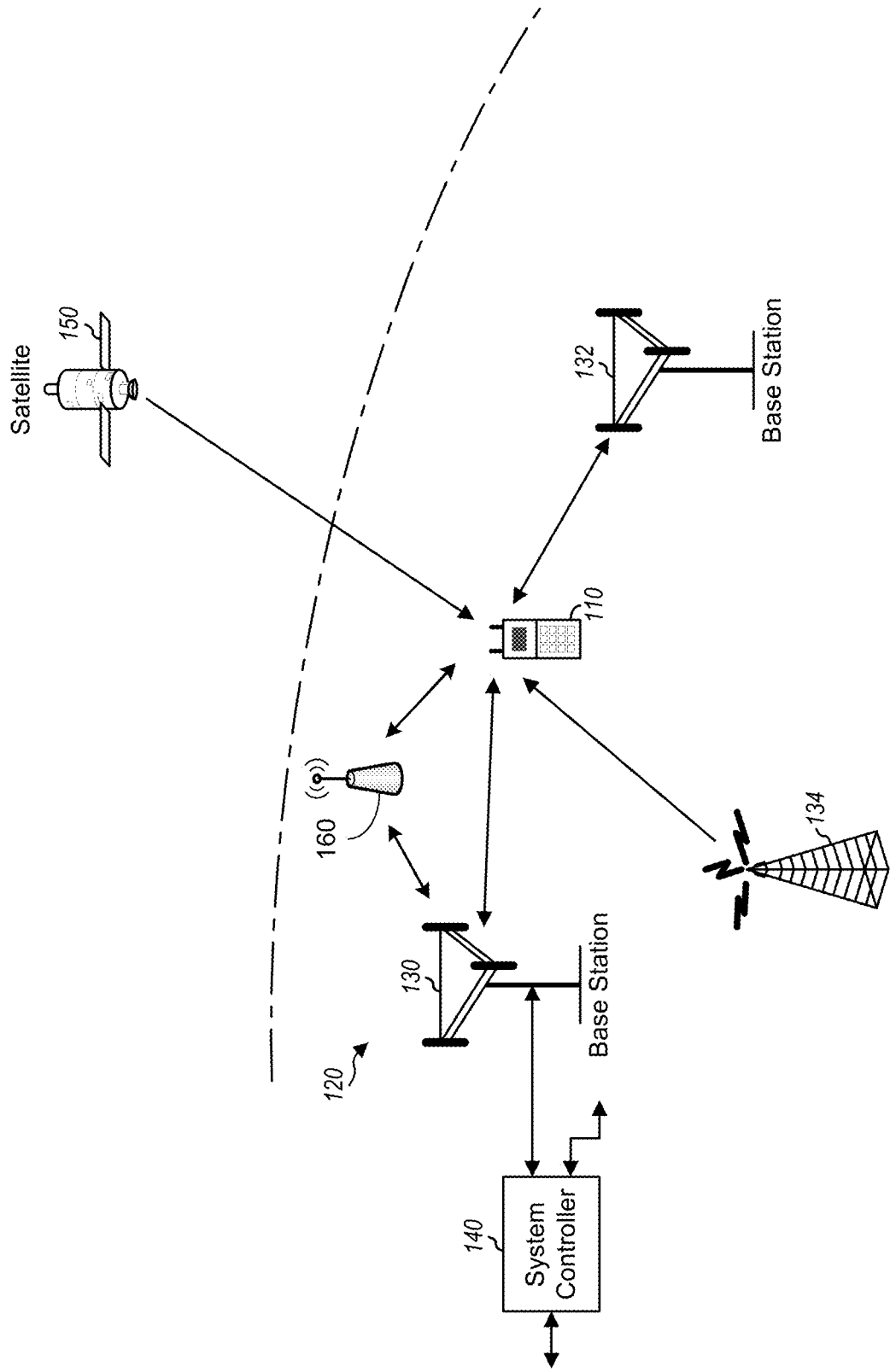
FIG. 1 is a diagram showing a wireless communication system communicating with a wireless device that can be implemented according to aspects described herein.

The detailed description set forth below in connection with the appended drawings is intended as a description of exemplary implementations and is not intended to represent the only implementations in which the invention may be practiced. The term "exemplary" used herein means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form. Drawing elements that are common among the following figures may be identified using the same reference numerals.

The progression of wireless communication infrastructure, such as for Third Generation Partnership Project (3GPP) fifth generation (5G) millimeter wavelength (mmW) systems, involves the use of antenna arrays with tens, hundreds, or thousands of elements. For example, 5G new radio (NR) massive multiple-in multiple-out (MIMO) antenna arrays with such elements can include designs which use phase alignment between different elements. Temperature changes, device aging, and other such considerations can lead to low-frequency phase drift (e.g., drift that occurs on a time-frame consistent with natural temperature changes, device aging, and other such changes as compared to high frequency phase spikes from power supply issues or other such transient or "spiky" phase noise issues). Such phase alignment between elements may include phase alignment between individual transmit or receive chains, for example as coupled to respective antennas, and/or between different transceivers or chips, for example in systems in which multiple transceivers or chips are coupled to various antenna arrays or tiled together to control transmit and/or receive operations in a system with a large number of antennas.

Aspects described herein include an analog sampler combined with phase computation and control systems in order to correct for such phase drift. In one illustrative aspect, the signal between a phase lock loop (PLL) and a local oscillator (LO) signal generator is sampled using an analog circuit with 1-bit quantization on a sampled signal. The phase is tracked using digital circuitry, and the phase is monitored at pre-defined intervals. A phase range is used in the monitoring, and phase corrections are applied by adjusting the phase through digital circuitry when the phase is out of range. Aspects described herein provide improved device performance with sub-1 degree phase accuracy in some implementations while providing a reconfigurable system that tracks low-frequency phase drift and may avoid conflicts in low-frequency phase correction that can be caused by transient or spiky phase noise sources.

Further details regarding aspects described herein are provided with respect to the figures below.

FIG. 1 is a diagram showing a wireless device 110 communicating with a wireless communication system 120. In accordance with aspects described herein, a wireless device can include transceivers including an architecture for tracking and correcting phase in accordance with aspects described herein. Further, as described herein, a base station, GNodeB, or other such device as described herein may include MIMO communication elements with transmit and receive chains used for multiple channels or channel beamforming. Examples herein can use the phase tracking and correction for a central PLL frequency which is used for LO generation to distribute a constant signal to different MIMO channels and/or chips to maintain performance. The wireless communication system 120 may be a Long Term Evolution (LTE) system, a Code Division Multiple Access (CDMA) system, a Global System for Mobile Communications (GSM) system, a wireless local area network (WLAN) system, a 5G NR (new radio) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA. Communication elements of the wireless device 110 for implementing mmW and non-mmW communications in accordance with any such communication standards can be supported by various designs of transceivers using a chained signal routing. For simplicity, FIG. 1 shows wireless communication system 120 including two base stations 130 and 132 and one system controller 140. In general, a wireless communication system may include any number of base stations and any set of network entities.

The wireless device 110 may also be referred to as a user equipment (UE), a mobile station, a terminal, an access terminal, a subscriber unit, a station, etc. Wireless device 110 may be a cellular phone, a smartphone, a tablet, or other such mobile device (e.g., a device integrated with a display screen). Other examples of the wireless device 110 include a wireless modem, a personal digital assistant (PDA), a handheld device, a laptop computer, a smartbook, a netbook, a tablet, a cordless phone, a medical device, a device configured to connect to one or more other devices (for example through the internet of things), a wireless local loop (WLL) station, a Bluetooth device, an automobile or automotive device, etc. Wireless device 110 may communicate with wireless communication system 120. Wireless device 110 may also receive signals from broadcast stations (e.g., a broadcast station 134) and/or signals from satellites (e.g., a satellite 150 in one or more global navigation satellite systems (GNSS); in other examples, the wireless device 110 may be configured to transmit to a satellite). Wireless device 110 may support one or more radio technologies for wireless communication such as LTE, WCDMA, CDMA 1x, EVDO, TD-SCDMA, GSM, 802.11, 5G, etc.

The wireless communication system 120 may also include a wireless device 160. In an exemplary embodiment, the wireless device 160 may be a wireless access point, or another wireless communication device that comprises, or comprises part of a wireless local area network (WLAN). In an exemplary embodiment, the wireless device 110 may be configured as a customer premises equipment (CPE), which may be in communication with a base station 130 and another wireless device 110, or other devices in the wireless communication system 120. In some embodiments, the CPE may be configured to communicate with the wireless device 160 using WAN signaling and to interface with the base station 130 based on such communication instead of the wireless device 160 directly communicating with the base station 130. In exemplary embodiments where the wireless device 160 is configured to communicate using WLAN signaling, a WLAN signal may include WiFi, or other communication signals.

Figure 2A:
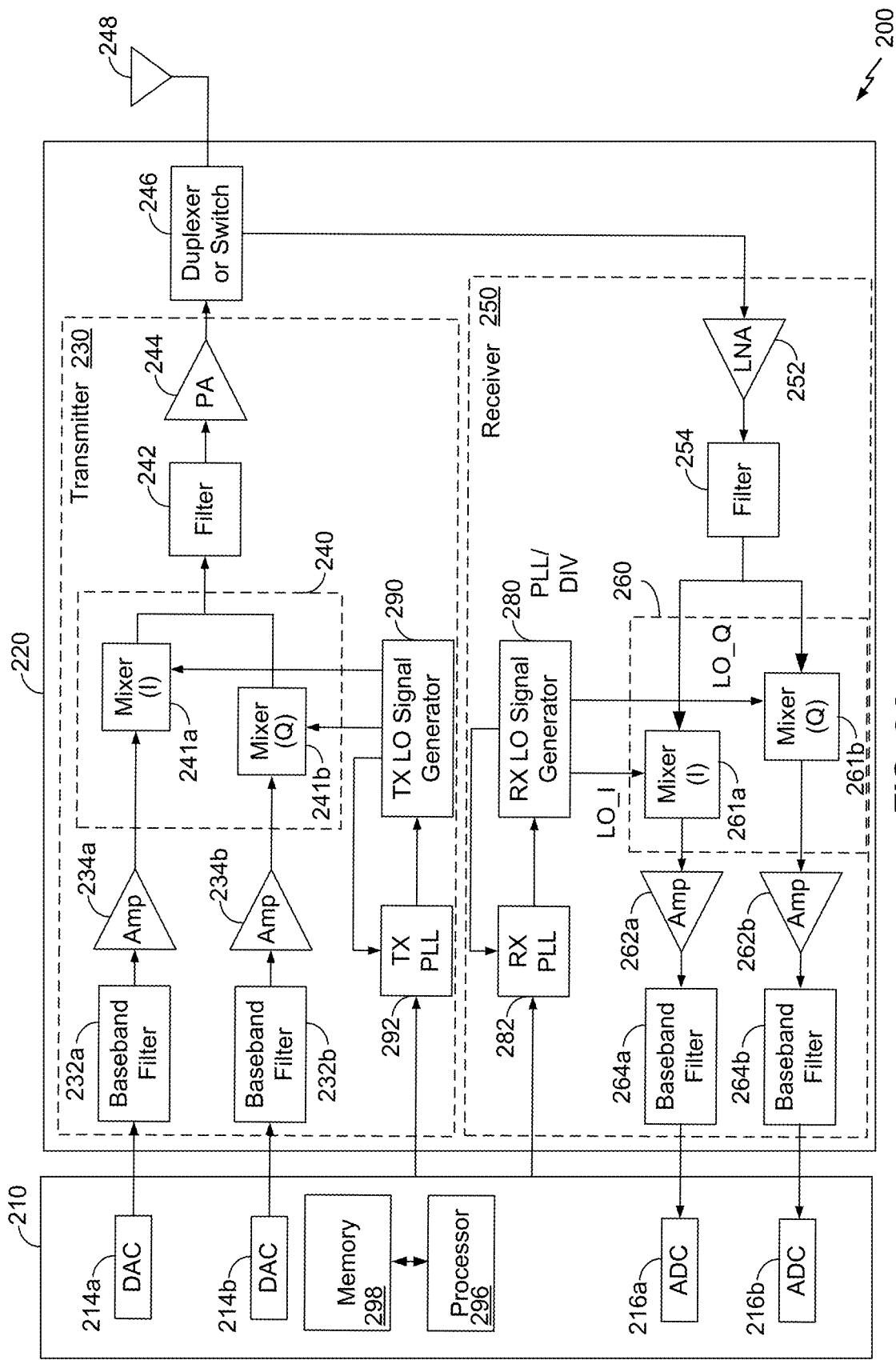
FIG. 2A is a block diagram showing portions of a wireless device in which aspects the present disclosure may be implemented.

FIG. 2A is a block diagram showing a wireless device 200 in which aspects of the present disclosure may be implemented. The wireless device 200 may, for example, be an embodiment of the devices (e.g., the base station 130 or 132, the wireless device 110 or 160, etc.) illustrated in FIG. 1. The circuitry described may be circuitry supporting mmW communications or other such communications using large arrays of antenna elements structured to receive signals via a chained routing (e.g., rather than a splitter-based routing, but in other examples a splitter-based routing may be used). In some examples, the wireless device 200 (or any of the devices described and/or illustrated hereinafter) may be an example of any of the devices illustrated in FIG. 1.

FIG. 2A shows an example of a transceiver 220 having a transmitter 230 and a receiver 250. In general, the conditioning of the signals in the transmitter 230 and the receiver 250 may be performed by one or more stages of amplifier, filter, upconverter, downconverter, etc. These circuit blocks may be arranged differently from the configuration shown in FIG. 2A. Furthermore, other circuit blocks not shown in FIG. 2A may also be used to condition the signals in the transmitter 230 and receiver 250. Unless otherwise noted, any signal in FIG. 2A, or any other figure in the drawings, may be either single-ended or differential. Some circuit blocks in FIG. 2A may also be omitted.

In the example shown in FIG. 2A, wireless device 200 generally comprises the transceiver 220 and a data processor 210. The data processor 210 may include a processor 296 operatively coupled to a memory 298. The memory 298 may be configured to store data and program codes, and may generally comprise analog and/or digital processing components. The data processor 210 or a portion thereof may be implemented as a modem. The transceiver 220 includes a transmitter 230 and a receiver 250 that support bi-directional communication. In general, wireless device 200 may include any number of transmitters and/or receivers for any number of communication systems and frequency bands. All or a portion of the transceiver 220 may be implemented on one or more analog integrated circuits (ICs), RF ICs (RFICs), mixed-signal ICs, etc.

A transmitter or a receiver may be implemented with a super-heterodyne architecture or a direct-conversion architecture. In the super-heterodyne architecture, a signal is frequency-converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the example shown in FIG. 2A, transmitter 230 and receiver 250 are implemented with the direct-conversion architecture.

In the transmit path, the data processor 210 processes data to be transmitted and provides in-phase (I) and quadrature (Q) analog output signals to the transmitter 230. In an exemplary embodiment, the data processor 210 includes digital-to-analog-converters (DAC's) 214a and 214b for converting digital signals generated by the data processor 210 into the I and Q analog output signals, e.g., I and Q output currents, for further processing. In other embodiments, the DACs 214a and 214b are included in the transceiver 220 and the data processor 210 provides data (e.g., for I and Q) to the transceiver 220 digitally.

Within the transmitter 230, baseband (e.g., lowpass) filters 232a and 232b filter the I and Q analog transmit signals, respectively, to remove undesired images caused by the prior digital-to-analog conversion. Amplifiers (Amp) 234a and 234b amplify the signals from the baseband filters 232a and 232b, respectively, and provide I and Q baseband signals. An upconverter 240 having upconversion mixers 241a and 241b upconverts the I and Q baseband signals with I and Q transmit (TX) local oscillator (LO) signals from a TX LO signal generator 290 and provides an upconverted signal. A filter 242 filters the upconverted signal to remove undesired images caused by the frequency upconversion as well as noise in a receive frequency band. A power amplifier 244 amplifies the signal from filter 242 to obtain the desired output power level and provides a transmit RF signal. The transmit RF signal is routed through a duplexer or switch 246 and transmitted via antennas 248. While examples discussed herein utilize I and Q signals, those of skill in the art will understand that components of the transceiver may be configured to utilize polar modulation.

In the receive path, the antennas 248 receive communication signals and provide a received RF signal, which is routed through duplexer or switch 246 and provided to a low noise amplifier (LNA) 252. The switch 246 is designed to operate with a specific RX-to-TX duplexer frequency separation, such that RX signals are isolated from TX signals, but other devices and/or methods of accommodating both TX and RX signals may be used. The received RF signal is amplified by LNA 252 and filtered by a filter 254 to obtain a desired RF input signal. Downconversion mixers 261a and 261b in a downconverter 260 mix the output of filter 254 with I and Q receive (RX) LO signals (i.e., LO_I and LO_Q) from an RX LO signal generator 280 to generate I and Q baseband signals. The I and Q baseband signals are amplified by amplifiers 262a and 262b and further filtered by baseband (e.g., lowpass) filters 264a and 264b to obtain I and Q analog input signals, which are provided to data processor 210. In the exemplary embodiment shown, the data processor 210 includes analog-to-digital-converters (ADC's) 216a and 216b for converting the analog input signals into digital signals to be further processed by the data processor 210. In some embodiments, the ADCs 216a and 216b are included in the transceiver 220 and provide data to the data processor 210 digitally.

In FIG. 2A, TX LO signal generator 290 generates the I and Q TX LO signals used for frequency upconversion, while RX LO signal generator 280 generates the I and Q RX LO signals used for frequency downconversion. Each LO signal is a periodic signal with a particular fundamental frequency. A phase locked loop (PLL) 292 receives timing information from data processor 210 and generates a control signal used to adjust the frequency and/or phase of the TX LO signals from LO signal generator 290. Similarly, a PLL 282 receives timing information from data processor 210 and generates a control signal used to adjust the frequency and/or phase of the RX LO signals from LO signal generator 280.

In an exemplary embodiment, the RX PLL 282, the TX PLL 292, the RX LO signal generator 280, and the TX LO signal generator 290 may alternatively be combined into a single LO generator circuit 295, which may include common or shared LO signal generator circuitry to provide the TX LO signals and the RX LO signals. Alternatively, separate LO generator circuits may be used to generate the TX LO signals and the RX LO signals.

Certain components of the transceiver 220 are functionally illustrated in FIG. 2A, and the configuration illustrated therein may or may not be representative of a physical device configuration in certain implementations. For example, as described above, transceiver 220 may be implemented in various integrated circuits (ICs), RF ICs (RFICs), mixed-signal ICs, etc. In some embodiments, the transceiver 220 is implemented on a substrate or board such as a printed circuit board (PCB) having various modules, chips, and/or components. For example, the power amplifier 244, the filter 242, and the switch 246 may be implemented in separate modules or as discrete components (and, in some examples, multiple power amplifiers, LNA(s), and/or other associated circuitry may be distributed across multiple chips), while the remaining components illustrated in the transceiver 220 may be implemented in a single transceiver chip.

The power amplifier 244 may comprise one or more stages comprising, for example, driver stages, power amplifier stages, or other components, that can be configured to amplify a communication signal on one or more frequencies, in one or more frequency bands, and at one or more power levels. Depending on various factors, the power amplifier 244 can be configured to operate using one or more driver stages, one or more power amplifier stages, one or more impedance matching networks, and can be configured to provide good linearity, efficiency, or a combination of good linearity and efficiency.

In an exemplary embodiment in a super-heterodyne architecture, the power amplifier 244, and the LNA 252 (and filter 242 and/or 254 in some examples) may be implemented separately from other components in the transmitter 230 and receiver 250, and may be implemented on a millimeter wave integrated circuit. While wireless device 200 describes one example of a device, it will be apparent that aspects described herein can be implemented in other architectures (e.g., super-heterodyne architectures), and the phase detection, correction, and tracking of the described sub-sampling architecture is not limited to the example of FIG. 2A.

Figure 2B:
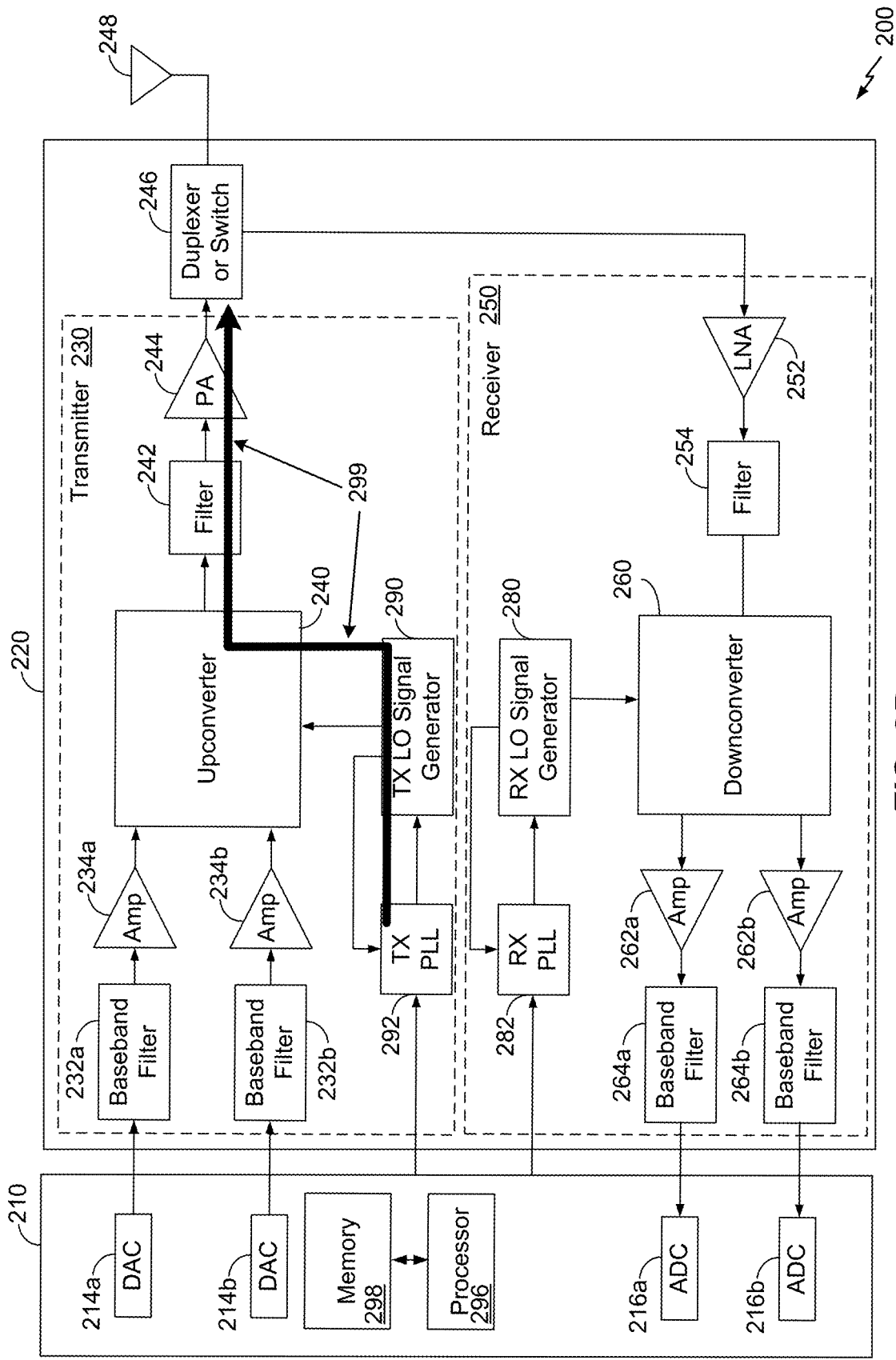
FIG. 2B is a block diagram showing portions a wireless device in which aspects of the present disclosure may be implemented.

FIG. 2B is a block diagram showing portions a wireless device in which aspects of the present disclosure may be implemented. FIG. 2B shows the same wireless device 200 from FIG. 2A, showing a signal path 299 for a signal vulnerable to low-frequency phase drift. The signal path 299 begins with the phase locked loop output from TX PLL 292, which is passed to the TX LO signal generator 290 to generate the LO signal. While a feedback loop is present between the TX PLL 292 and the TX LO signal generator 290, such a loop does not compensate for low frequency phase drift, which can impact system performance, particularly in large MIMO systems (e.g., as implemented in base stations such as the base stations 130, 132, 1204, etc.) where phase is synchronized between channels, and where performance can be impacted by phase drift as described above. The phase of signals along the signal path 299 may be subject to temperature based phase drift or other low frequency phase drift, and when the signals are propagated to elements of a massive MIMO array, it can result in degraded performance when such phase drift from low frequency sources is not compensated for. While for simplicity, FIGS. 2A and 2B illustrate a simple device structure, similar structures can be used to support MIMO antenna arrays with large numbers of antenna elements. In such systems, a central PLL and LO signal generator can be used with implementations described herein to provide a stable signal with limited phase drift to different elements of the MIMO array. Such centralized PLL and LO operation can apply to both transmit and receive chains in MIMO systems. Additional details of such low frequency phase drift within a device are described below with respect to FIG. 3.

Further, while various descriptions and examples herein are described in the context of the signal path 299 in the transmitter 230 as illustrated in FIG. 2B, the receiver 250 is similarly subject to low frequency phase drift, and it will be apparent that a similar corresponding architecture for a receive signal path can be used to compensate for phase drift, just as is described for a transmit signal path such as the signal path 299. In one example aspect, the architecture described herein can be used to sample a signal between the TX PLL 292 and the TX LO signal generator 290 (e.g., the output of the TX PLL 292 prior to modification by the TX LO signal generator 290). Similarly, in some aspects a corresponding architecture implementation can be used to sample and process a signal output from the RX PLL 282 prior to input to the RX LO signal generator 280.

Figure 3:
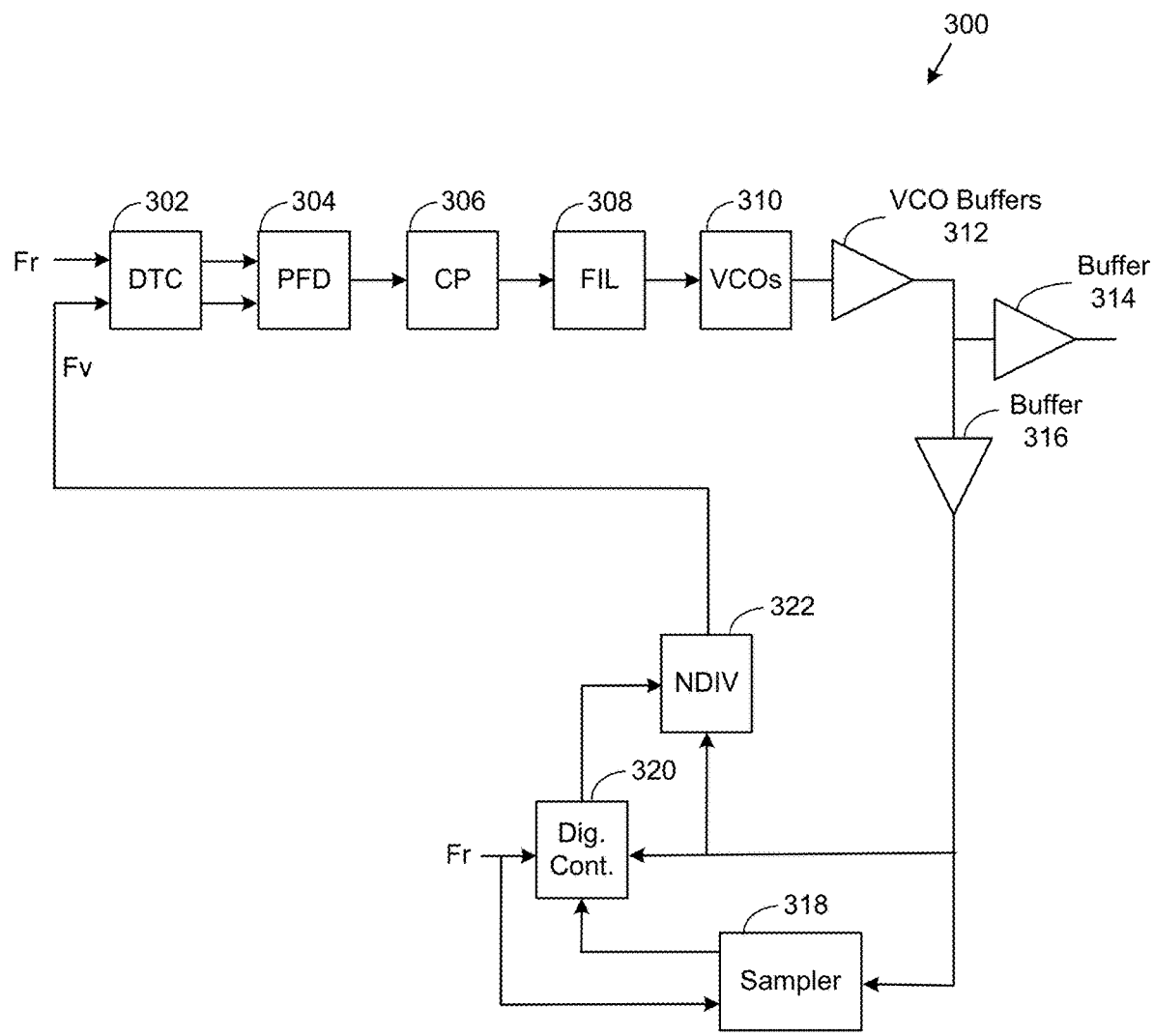
FIG. 3 is a block diagram showing portions of a wireless device in which aspects of the present disclosure may be implemented.

FIG. 3 is a block diagram showing portions of a TX PLL 300 (e.g., similar to the TX PLL 292) which includes phase sampling and control circuitry. Portions of the TX PLL 300 can introduce low frequency (e.g., temperature based) phase drift into a transmit chain. The TX PLL 300 of FIG. 3 may be used in a wireless device in which aspects of the present disclosure may be implemented as shown. The block diagram of the TX PLL of FIG. 3 includes digital-to-time converter (DTC) 302, phase frequency detector (PFD) 304, charge pump (CP) 306, filter 308, voltage controlled oscillator(s) (VCOs) 310, VCO buffer(s) 312, buffers 314 and 316, phase sampling circuitry 318, digital phase computation and control circuit 320 (or circuitry), and digital divider (NDIV) 322. VCOs 310 can include low, middle, and high frequency VCOs with separate buffers for each, and the buffer 314 may output signals both to a LO generator (e.g., the TX LO signal generator 290) as well as to the digital phase computation and control circuit 320 discussed below. The buffer 316 provides a PLL signal to the phase sampling circuitry 318. An example of the phase sampling circuitry is provided in FIG. 5A below. The phase sampling circuitry 318 provides sample signals to the digital phase computation and control circuit 320. The digital phase computation and control circuit 320 then controls the NDIV 322 which provides a phase feedback clock FAT to the DTC 302, which also receives a reference clock Fr.

Within the TX PLL 300, the DTC 302, the PFD 304, the VCO buffers 312, and the NDIV 322 can all particularly introduce significant (e.g., temperature based) phase drift as the operating conditions of a wireless device including the TX PLL 300 changes. Similarly, CP 306 leakage can also introduce (e.g., temperature based) phase drift depending on device operating conditions. FIG. 3 shows the TX PLL 300 as including phase drift compensating circuitry in the form of the phase sampling circuitry 318 and the digital phase computation and control circuit 320. In various implementations, the phase sampling circuitry 318 or other implementations of a phase sampler in accordance with aspects described herein can sample and provide a sample signal to the digital feedback circuitry anywhere in a signal path between a PLL and a corresponding LO signal generator (e.g., the TX PLL 292 and the TX LO signal generator 290 or the RX PLL 282 and the RX LO signal generator 280).

Figure 4:
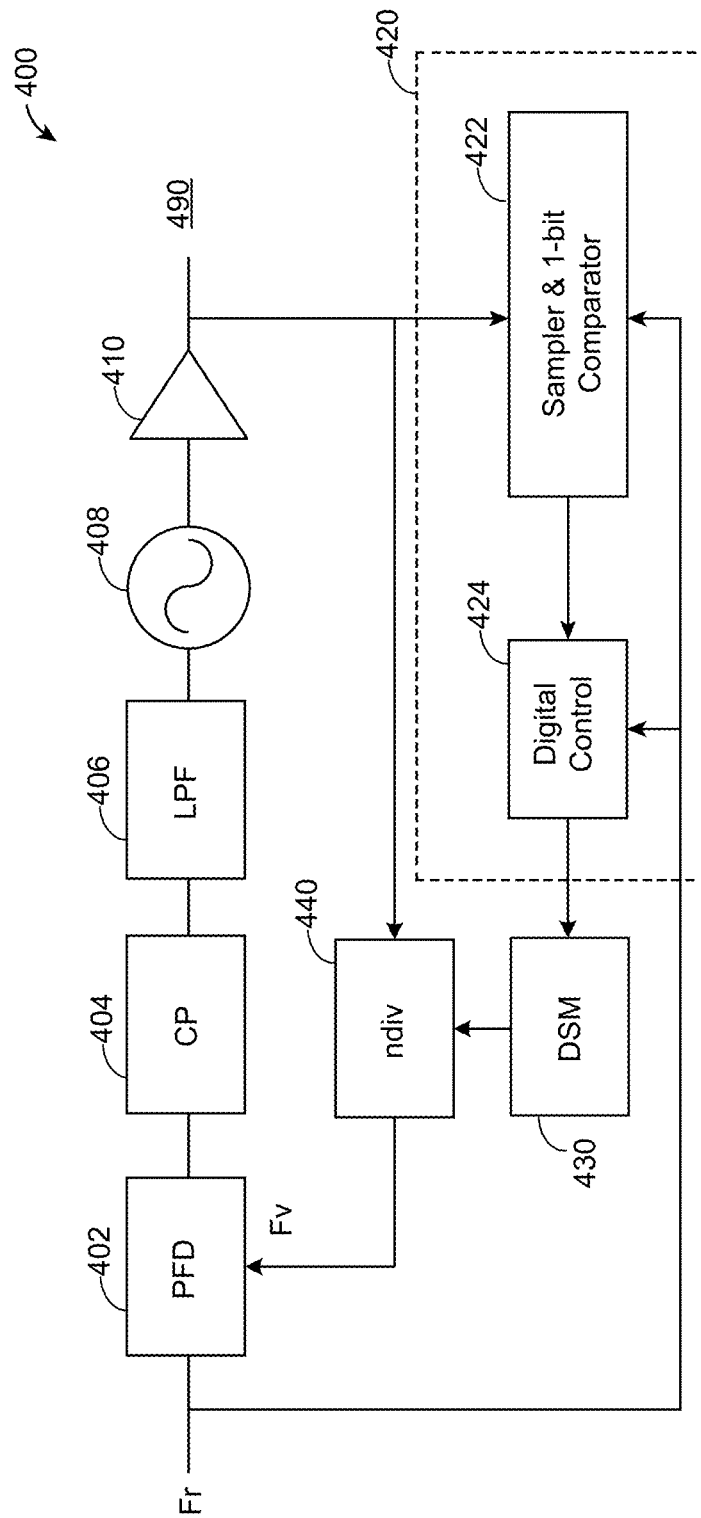
FIG. 4 is a block diagram showing portions of a wireless device in which aspects of the present disclosure, including a sampler and 1-bit comparator, may be implemented.

FIG. 4 is a block diagram showing portions of a wireless device 400 in which aspects of the present disclosure, including a sampler and 1-bit comparator, may be implemented. FIG. 4 shows the architecture for phase drift tracking and compensation in accordance with aspects described herein in the form of the VCO phase circuitry 420, which includes an analog sampler and 1-bit comparator 422, along with digital control circuitry 424. As described above, in various implementations the VCO phase circuitry 420 can be implemented in a signal path (e.g., the signal path 299) anywhere between a PLL and a corresponding LO signal generator. The LO signal generator may be configured to generate I and Q signals, as described above, or may be configured to generate additional phases or reduce (e.g. divide) a frequency of a signal output from the PLL, etc. In addition to the VCO phase circuitry 420, the wireless device 400 of FIG. 4 includes phase frequency detector 402, charge pump 404, loop and/or low pass filter 406, VCO(s) 408, buffer(s) 410, PLL output 490, programmable divider 440, and delta sigma modulation circuitry 430.

The VCO phase circuitry 420 operates as a phase detection, correction, and tracking system with an analog part (e.g., the sampler and 1-bit comparator 422) and a digital part (e.g., the digital control circuitry 424). Implementations described herein can perform a simple 1-bit quantization on a sampled PLL signal taken from any point in a path between a PLL and a LO generator using the sampler and 1-bit comparator 422 as described above. The digital control circuitry 424 can then be used in computing the LO phase, monitoring the phase (e.g., at pre-defined intervals), and applying one-time phase corrections when the digital control circuitry 424 determines at a phase computation cycle that the phase is out of range.

The digital control circuitry 424 can be configured in some implementations to correct an entire phase error in a one-time phase correction, or can be configured for limited phase correction. By periodically performing measurements with associated individual phase corrections, the VCO phase circuitry 420 can compensate for low frequency phase drift, such as drift due to temperature changes, while avoiding high frequency phase shift, such as phase shifts due to power supply spikes or other such transient phase interruptions. The digital control circuitry 424 can provide highly accurate adjustments as well as reconfiguration options and possibilities for integration with other digital control systems. In some implementations, accuracy of phase tracking for such low-frequency phase drift can be within one degree or less. In other implementations, other accuracies can be implemented in a design based on the performance preferences of a given design.

As illustrated in both FIGS. 3 and 4, the input to the sampler is shown at the output of a VCO buffer (e.g., the buffers 410 or 312 for corresponding VCOs 408 and 310). In some implementations, the input signal for the sampler comes from the output of such buffers. In some implementations, the input signal for the sampler comes from any position in a signal path between a PLL and a LO generator circuit. In other implementations, phase drift can be detected via a detector tap from any position in a path impacted by the frequency signal (e.g., any position in the path 299). In any implementation, the phase detected at any position in a path is then used to perform a phase calculation, and apply a correction at a corresponding PLL when the phase is out of range. The phase may be corrected by adjusting a divider (e.g., the divider 440), by adjusting the phase using delta sigma modulation via DSM circuitry 430, or in any other manner.

Figure 5A:
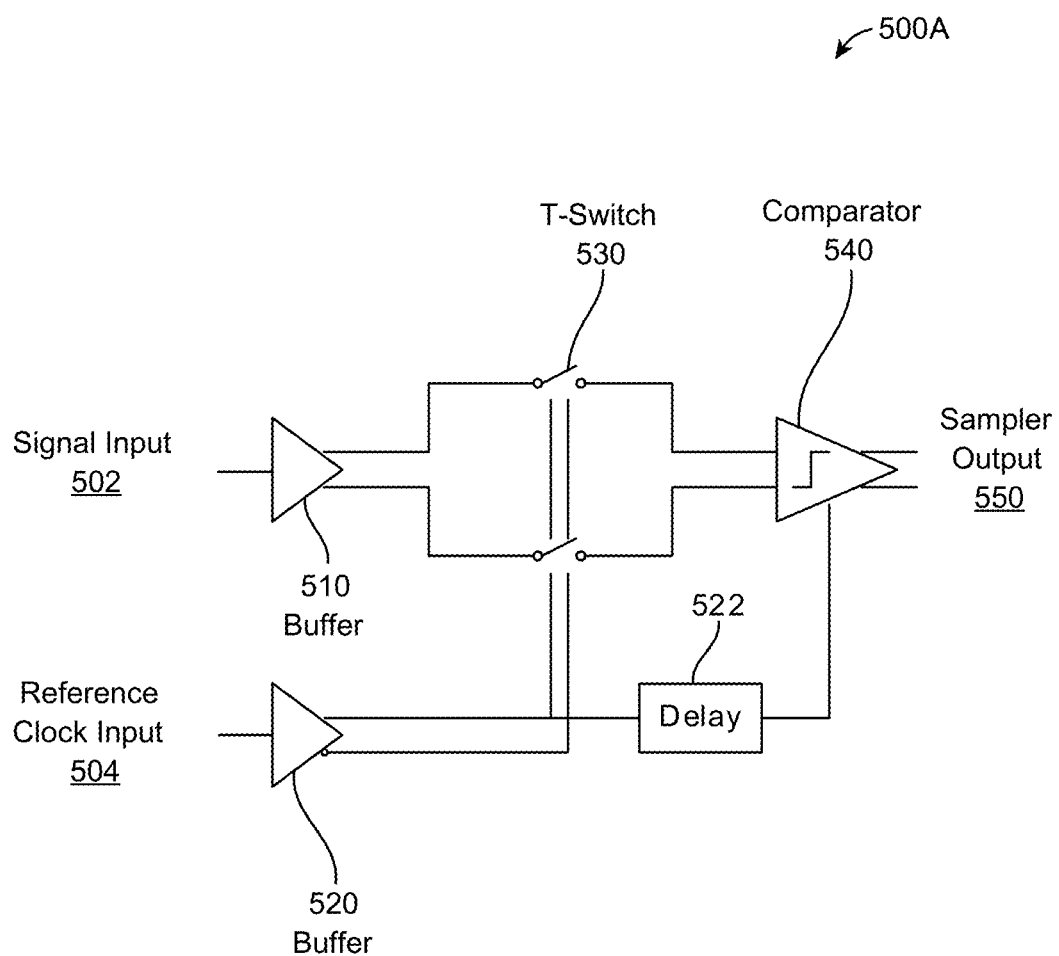
FIG. 5A is a diagram illustrating an analog sampler and 1-bit comparator including a switch that may be used in accordance with aspects of the present disclosure.

FIG. 5A is a diagram illustrating an analog sampler and 1-bit comparator 500A including a switch that may be used in accordance with aspects of the present disclosure. The analog sampler and 1-bit comparator 500A can, in some implementations, be used as the sampler and 1-bit comparator 422 of FIG. 4 or as the phase sampling circuitry 318. The analog sampler and 1-bit comparator 500A includes a reference clock input 504 (e.g., a PLL clock signal such as the reference clock Fr), a signal input 502 (e.g., from a tap point in a path, such as a path between a PLL and a LO signal generator or a tap from the path 299 as described above), corresponding buffers 510 and 520 to buffer the signals, a switch 530 (which may be referred to as a T-switch in some implementations, as described below), a delay path 522 (e.g., in the path used to couple the output of the buffer 520 to a comparator 540 for timing control of the signal at sampler output 550), the comparator 540, and the sampler output 550. In other examples, one or both of the buffers 510, 520 are omitted.

The buffer 510 can isolate the analog sampler and 1-bit comparator 500A from the signal path being sampled, to avoid degrading signals on the signal path. The reference buffer 520 can similarly provide isolation from a clock, as well as improving a slew-rate of the clock transition for improvement of the measurement. The clock signal from the reference clock input 504 is used both with the T-switch 530 and the comparator 540. The T-switch 530 provides tracking of the input signal from the signal input 502 when the T-switch 530 is closed (e.g., during an "on" state), and the voltage is held at the comparator 540 input when the T-switch 530 is open (e.g., during an "off" state). The delayed clock signal from the delay path 522 is used to trigger the comparator 540 voltage comparison following every edge of the reference clock to generate the output 1-bit quantization as a 1 or a 0 signal at the sampler output 550. The delay path 522 can allow the signal to settle following a T-switch 530 transition between an on and an off state.

In some implementations, the reference clock input 504 receives a PLL clock input, which can, for example, be a clock at approximately 153 megahertz (MHz), 300 (MHz), or another such reference frequency. The aspects illustrated in FIG. 5A show T-switch 530, which include the path between the buffer 510 and the comparator 540 as the top part of the T, and the connection to the reference clock input 504 (e.g., between the buffer 520 and the delay 522) as the base of the T, which provides the signal to control the switching of the T-switch 530. In other implementations, other switching structures or structures to control the input signals to the comparator 540 can be used. In some implementations, for example, pass gating can be used to control the signals at the input to the comparator 540.

Figure 5B:
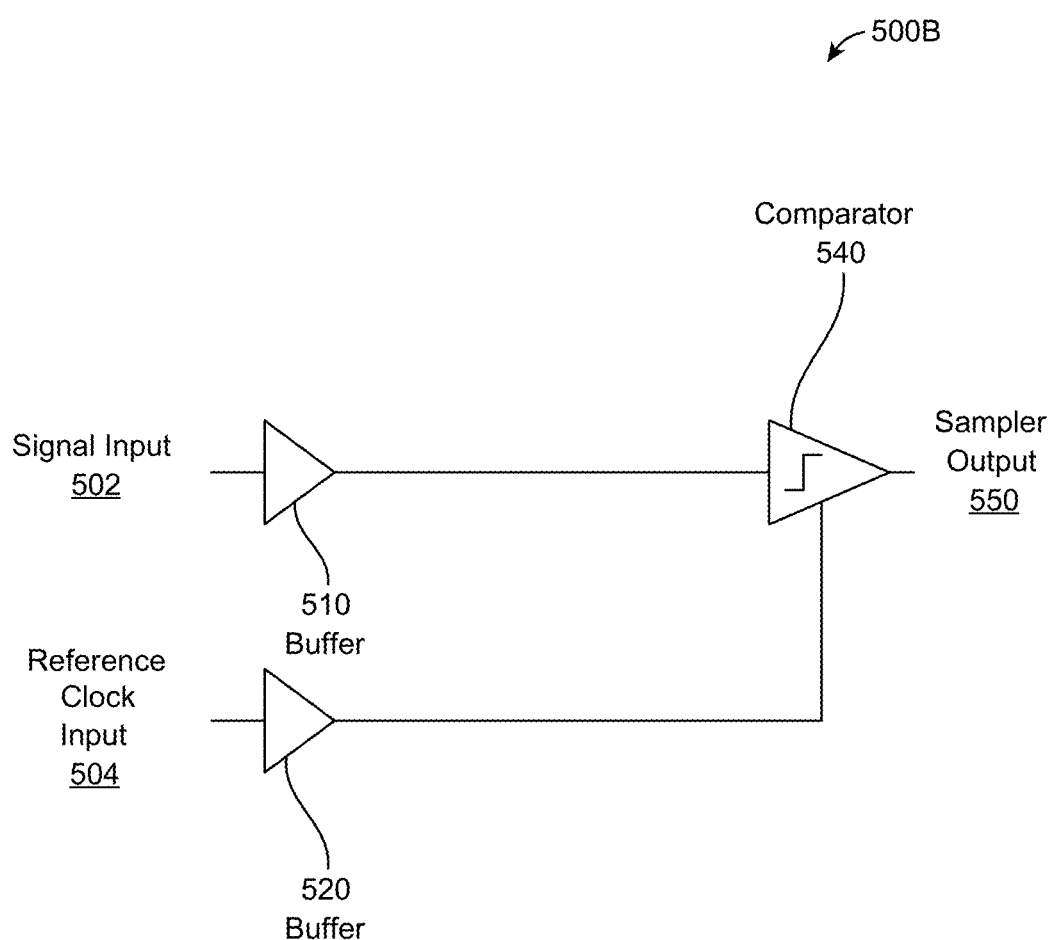
FIG. 5B is a diagram illustrating an analog sampler and 1-bit comparator excluding a switch that may be used in accordance with aspects of the present disclosure.

FIG. 5B is a diagram illustrating an analog sampler and 1-bit comparator 500B excluding the switch that may be used in accordance with aspects of the present disclosure. In an implementation without a T-switch (e.g., a switch as described in FIG. 5A), a comparator is used to compare input signals in order to make a decision based on the amplitude of the two input signals at the moment when the sampling clock activates the comparison. The 1-bit output from the comparator at this moment is then used for device operation. The analog sampler and 1-bit comparator 500B accepts the sample signals as illustrated in FIG. 5A, but simply performs a comparison and sampling without use of the switch to track and hold the sampled signal (e.g., where the signal is held at the comparator input by operation of the T-switch when the switch is open). Instead, the comparator 540 simply compares the signal directly, at the moment when the clock signal from the buffer 520 arrives, and outputs the 1-bit quantization value without the track and hold from the T-switch. The digital control processing of the sampler output 550 without the T-switch remains the same.

Figure 6:
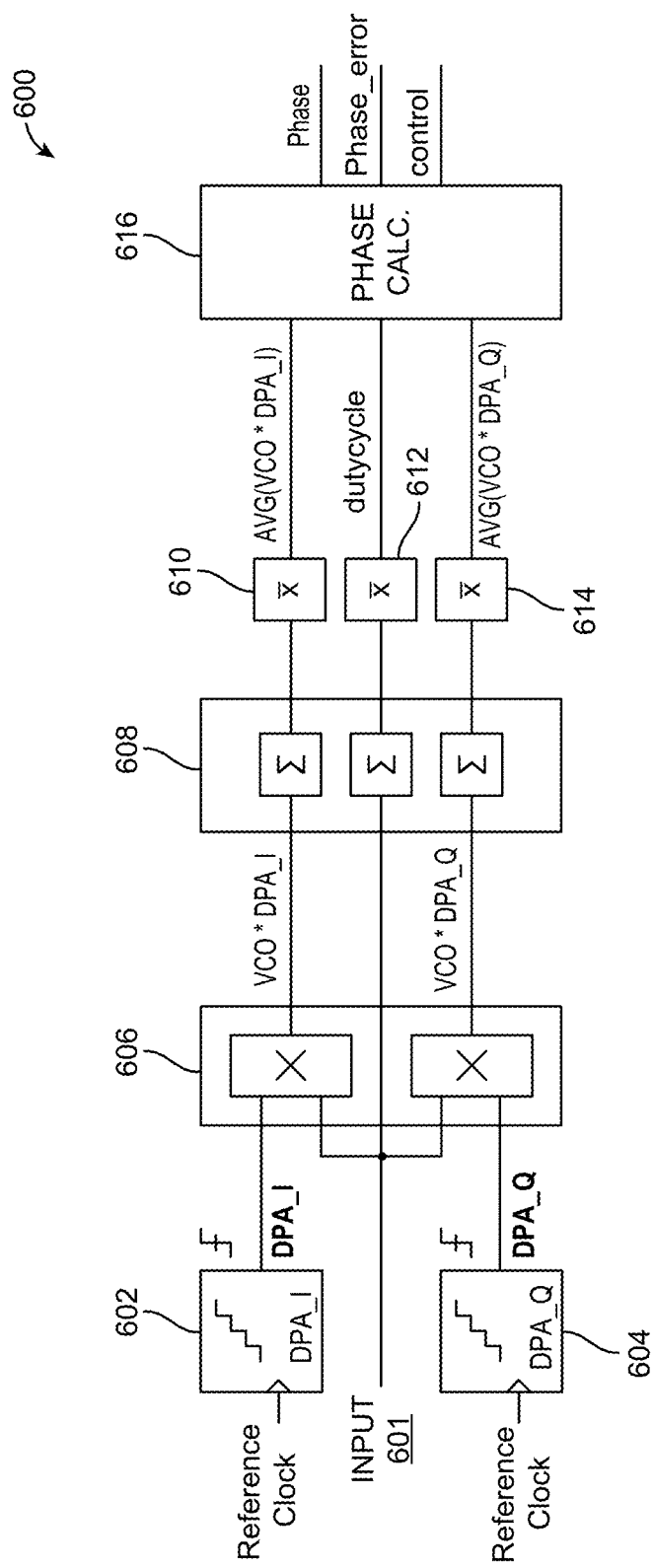
FIG. 6 is a block diagram illustrating aspects of a digital phase computation and control circuit in accordance with aspects of the present disclosure.

FIG. 6 is a block diagram illustrating aspects of a digital phase computation and control circuit 600 (or circuitry) in accordance with aspects of the present disclosure. The digital phase computation and control circuit 600 can be similar to the digital phase computation and control circuit 320 of FIG. 3 and the digital control circuitry 424 of FIG. 4. The digital phase computation and control circuit 600 receives a 1-bit quantized input from the sampling circuitry (e.g., the output 550 from the analog sampler and 1-bit comparator 500A or 500B) at input 601. Circuitry of two digital phase accumulators 602 and 604 receive the reference clock that was provided to the sampling circuitry (e.g., the reference clock input, such as the reference clock Fr). Other inputs may also be received by the accumulators 602 and 604. Each digital phase accumulator 602 and 604 is used with the samples from the sample circuitry to calculate a phase, as detailed below. As detailed below, however, each individual detection calculation may have a detection "dead zone" when the input signal duty-cycle is not 50%. Calculations associated with such dead zones do not correctly reflect the information used for detection calculation, and in the dead zone, the calculation is not relied on for determining a phase as well as a phase error. By using two digital phase accumulators with different initial phase, the detection dead zones are eliminated as the calculations are performed to determine the phase over a significant number of clock cycles. The two digital phase accumulators will not have dead zones at the same time, and so when a dead zone occurs for one of the two accumulators, the calculations associated with the dead zone can be discarded or otherwise ignored.

The use of two digital phase accumulators 602 and 604 may also be considered as follows. The phase calculation by the digital phase computation and control circuit 600 may correct the error caused by non-50% duty cycles. Two calculations are run in parallel by the digital computation and control circuit 600 in the illustrated example. Each calculation may have a detection dead zone when the duty cycle is not 50%. By switching between the two calculations, the dead zones can be avoided, and the calculated phase can be determined accurately. While the parallel paths/calculations are beneficial in certain implementations, it will be understood that a single path/calculation may be used in some configurations.

The two separate calculations can be represented as follows, with a first digital phase accumulator calculation $\Theta 1$ associated with accumulator 602 and a non-50% duty cycle at 90 and 270 degrees, and with a second digital phase accumulator calculation $\Theta 2$ associated with accumulator 604 and a non-50% duty cycle at 0 and 180 degrees. Calculation circuitry 616 performs digital phase calculations. In the illustration of FIG. 6, "VCO" is used to represent the sample value at input 601, DPA_I is used to represent the 1-bit quantized sinusoidal waveform with the same phase as the digital phase accumulator 602, and DPA_Q is used to represent the 1-bit quantized sinusoidal waveform with the same phase as digital phase accumulator 604. VCO, DPA_I and DPA_Q are multiplied and averaged to determine a phase value. As described above, in some implementations, two phases $\Theta 1$ and $\Theta 2$ can be calculated. The non-50% duty cycle of the input signal can cause calculation errors associated with the duty cycle and different non-overlapping dead zones for the two different phase calculations. By switching between the two calculations based on the calculated phase values, these calculation errors caused by the non-50% duty cycles can be removed.

Alternative systems can calculate phase using digital quantization of the phase signal, which may involve both significant resources to analyze the phase signal, as well as more complex calculation algorithms when processing a digitized signal to determine phase drift. Such systems calculate phase and phase drift at individual points in time, and are subject to significant errors and overcorrection responses when a phase measurement captures a transient phase error due to power supply noise, switching, or other such high frequency phase effects. By contrast, the 1-bit quantization calculations described above involve large numbers of simple calculations over time, that can be configured (e.g., by selecting the number of samples used in a calculation, the error threshold, etc.) for a wide variety of operational conditions and device performance preferences.

Calculation circuitry 608 sums the values output from the calculation circuitry 606, and calculation circuitry 610, 612, and 614 determine an average value. Circuitry 610 provides the average value from the calculation using the accumulator 602, circuitry 614 provides the average value from the calculation using the accumulator 604, and circuitry 612 may provide a calculation cycle. Circuitry 616 then uses the accumulated values to calculate a phase value and a phase error. If the phase error (e.g., the phase drift value) is larger than a threshold amount, a control signal can be output (or a control signal may be output all the time, but a value of the control signal may be varied based on the phase error), which may be used with delta-sigma modulation circuitry to adjust a PLL phase. Such phase adjustment tracks through the circuitry, and will impact the next cycle of measurement. While the phase value and phase error are shown as being output from circuitry 616 in FIG. 6, such values may not be output. For example, they may be used only internally by the circuitry 616 to determine whether to output the control or what value to output on the control.

The values referenced above may be averaged (e.g., at circuitry 610, 612, and/or 614) to provide an accurate ending result. The intermediate values may not provide a significant result, due to the variations of individual calculations. The process can be considered as accumulating data to determine the phase as an accurate calculation of a data transition value associated with a phase in some examples. A frequency resolution of the averaging can be programmable or selectable. For example, with a reference clock in the range of 100-200 MHz, the averaging time may be adjusted from a few microseconds to 10s of milliseconds. Longer averaging times may be associated with higher accuracy, but may require longer amounts of time to complete a single calculation.

The configurations described with respect to FIG. 6 are just examples of a how a phase error (e.g., phase drift) and/or control signal may be determined. Other configurations for determining a phase error and/or a control signal based on comparison of a phase error to a threshold may be implemented. For example, digital processing for determining a divider (or DSM) adjustment (e.g., to change a divide ratio or other divide value inside the PLL) based on a 1-bit sample from an analog sampler other than illustrated in FIG. 6 may be used.

Figure 7:
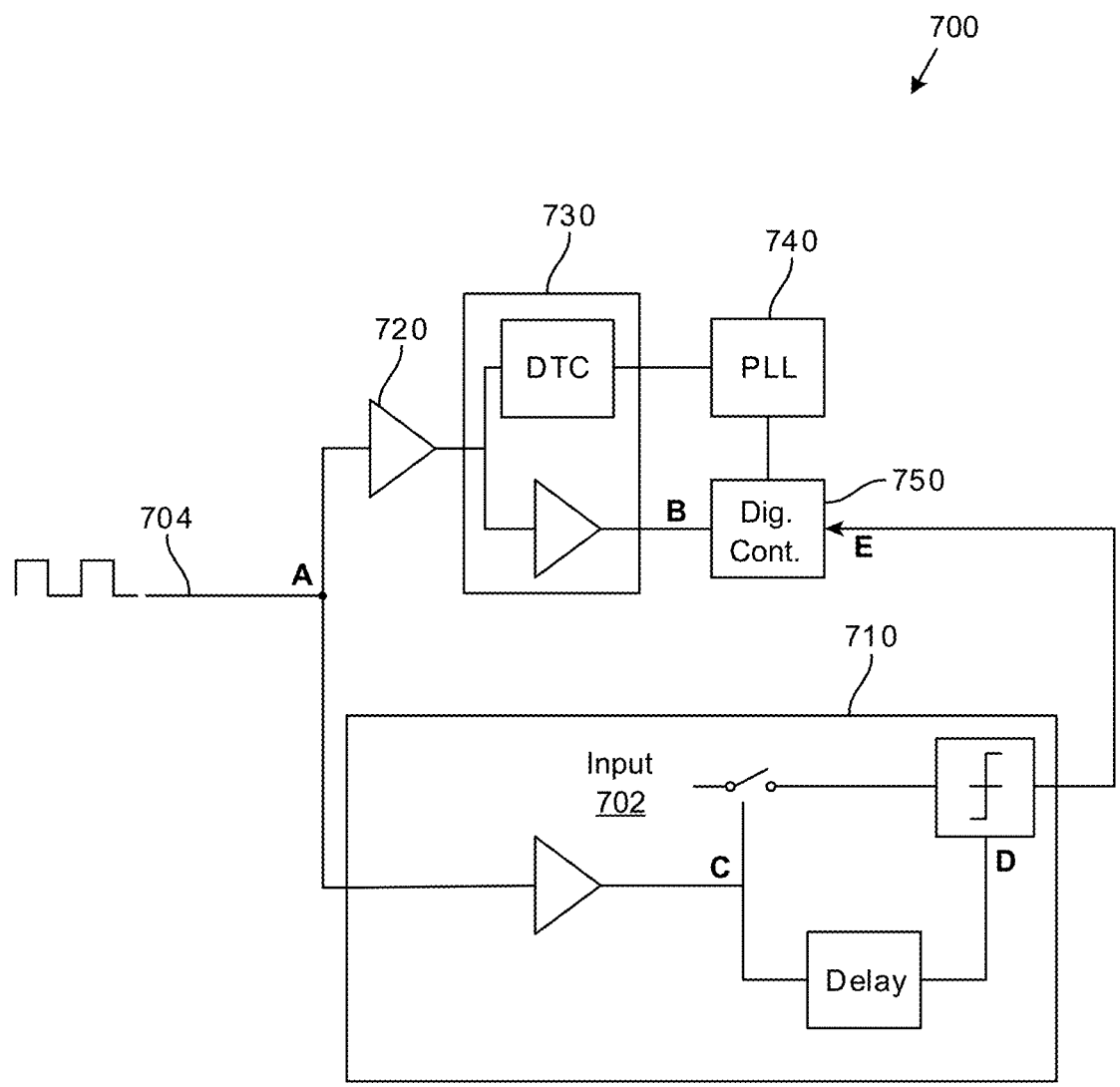
FIG. 7 is a block diagram showing portions of a wireless device in which aspects the present disclosure may be implemented.

FIG. 7 is a block diagram showing portions 700 of a wireless device in which aspects the present disclosure may be implemented. FIG. 7 illustrates paths for signals used by the digital phase computation and control circuit 600 of FIG. 6. In other examples, other structures can be used. FIG. 7 illustrates an input 702 from a detection position in a signal path as described above. The position in the signal path tapped (e.g., used to provide an input) to generate subsamples of a signal phase can occur along a signal path at any position where the PLL phase is represented in the signal. In some implementations, the input signal is taken from a position at the VCO output of a PLL, and before a LO generator circuit. Circuitry 710 is the phase sample circuitry (e.g., 318, 422, 500) which provides a one bit sample to digital control circuitry 750 (e.g., 320, 424, 600). A reference clock (e.g., Fr) from input 704 is provided to both the phase sample circuitry 710 and to digital control circuitry 750. The digital control circuitry 750 may account for delays through various buffers 720 and circuitry 730 as part of the phase calculation and control. When a calculated phase error in control circuitry 750 is determined to be larger than a threshold, the digital control circuitry 750 can provide a feedback (e.g., control) signal to the PLL circuitry 740 (e.g., via delta sigma modulation circuitry such as the DSM 430, where in the PLL circuitry may include components in the device 400) to correct for the error.

The signals at positions A, B, C, and D are the reference clock from input 704 with various delays based on the propagation time as the reference clock travels through the circuitry. The line and buffer delays may be matched by a system design with a comparator (e.g., in 710) settling time so that the digital control circuitry is timed to allow the digital phase accumulators (e.g., accumulators 602 and 604, for example in 750) to be matched with the 1-bit sample signal from the analog sampler (for example, the circuitry 710, e.g., 318, 422, 500A, 500B, etc.) The clock signals and samples are then used by the digital control circuitry 750 consistent with the description above for FIG. 6.

Figure 8:
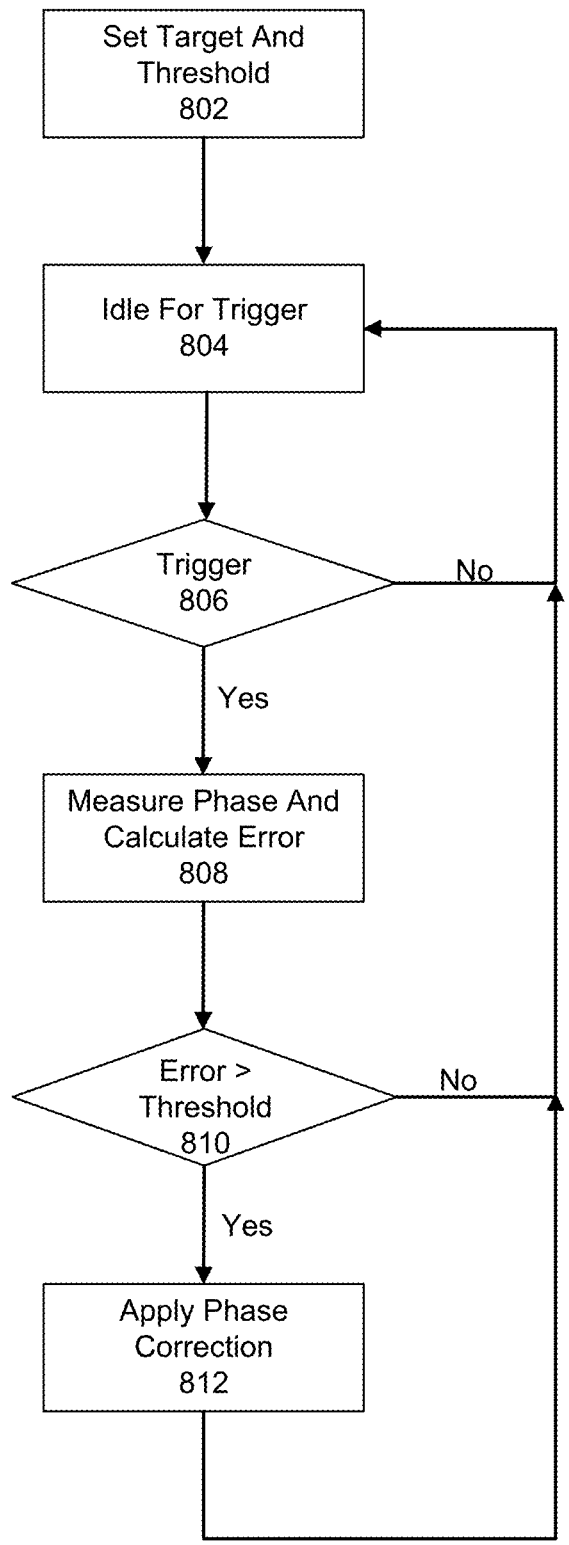
FIG. 8 is a flow diagram illustrating aspects of phase error measurement and correction in accordance with some implementations of the present disclosure.

FIG. 8 is a flow diagram illustrating aspects of phase error measurement and correction in accordance with aspects of the present disclosure. In block 802, a target and threshold are set. The target can, for example, be to allow a phase error of 5 degrees. The target can additionally include a calculation cycle (e.g., the period to perform one calculation, as described above) based on the frequency of error correction desired, and the accuracy of the tracking. A smaller threshold will result in more frequent adjustments; a smaller calculation cycle will result in more frequent phase measurements and error calculations, but less accurate measurements due to the averaging operations described above with respect to FIG. 6 occurring over a shorter length of time. The phase calculation and error determination portions of digital control circuitry (e.g., circuitry 616 or similar portions of digital control circuitry 750, 424, etc.) then idles as part of block 804 until a trigger occurs in block 806. The trigger in block 806 can be, for example, a time expiration or completion of sample collection over a certain time period or number of cycles selected as part of block 802 operation. The phase calculations are performed in block 808, along with an associated phase error value calculation. During block 810, if a phase error is determined to be larger than the threshold value selected in block 802, then a phase correction is applied in block 812. After completion of block 812, the loop continues at block 804, with idling until a subsequent calculation (e.g., over the period of time for completion of one calculation, which may vary based on particular design or device settings) completes, at which point the phase and phase error calculations are repeated.

As described above, performing such calculations using samples collected over a selectable calculation cycle (e.g., the configurable amount of time for performing a calculation, where a larger time increases accuracy, as described above) allows both targeted calculation accuracy as well as avoiding and averaging out of phase error spikes with high frequency. Power supply phase spikes, for example, may cause phase errors in a small number of samples over the course of a given calculation, but the impact on the calculated phase and phase error for a given calculation will be small due to the averaging described above. Such operations function as a control mechanism to avoid false corrections that other systems can trigger due to high frequency phase error spikes captured in a system attempting to compensate for low-frequency (e.g., temperature) based phase drift.

Figure 9:
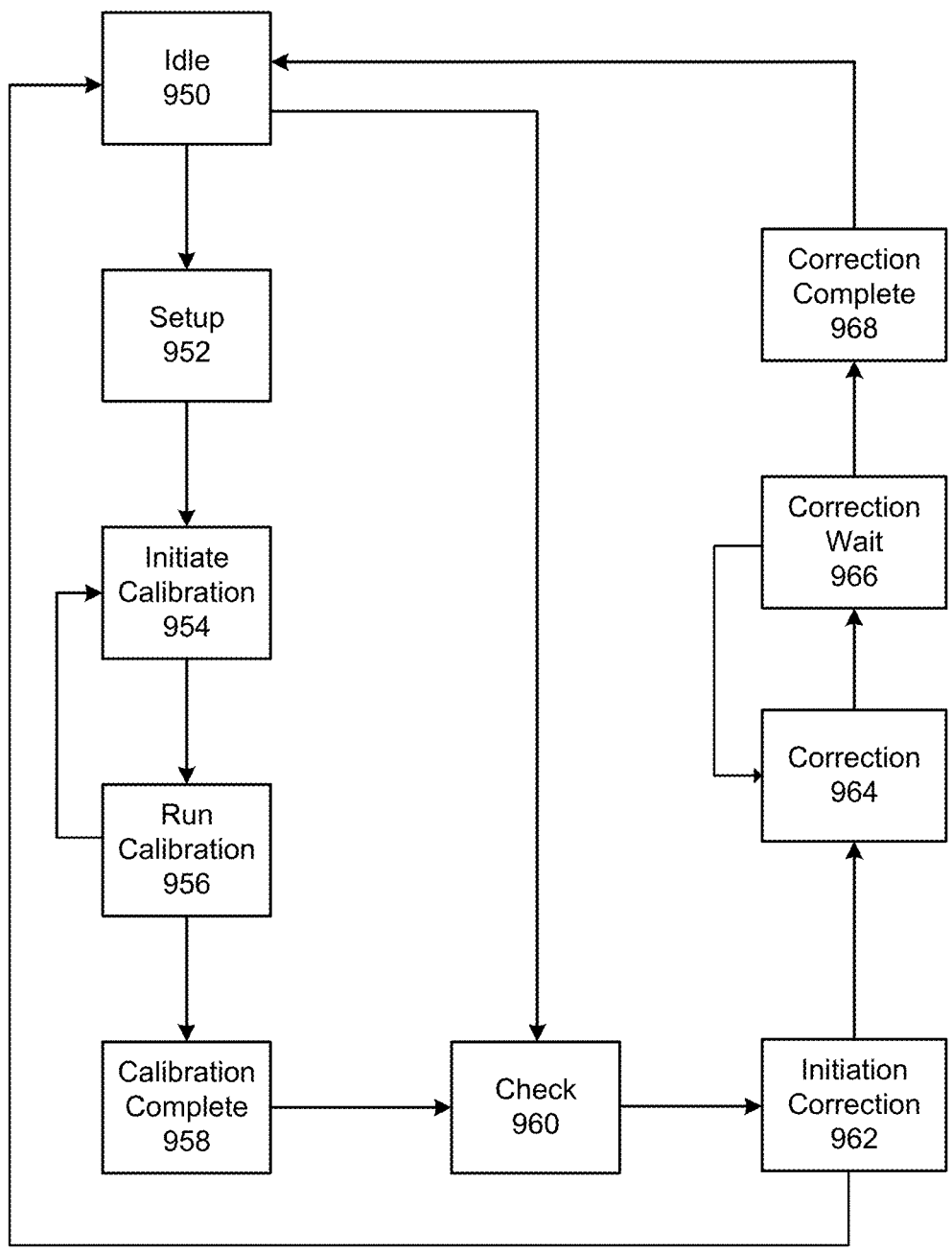
FIG. 9 is a state diagram illustrating aspects of phase error measurement and correction in accordance with some implementations of the present disclosure.

FIG. 9 is a state diagram illustrating aspects of phase error measurement and correction in accordance with some implementations of the present disclosure. The diagram of FIG. 9 describes operational states and transitions between states that can be implemented by digital phase computation and control circuitry (e.g., circuitry 320, 424, circuitry used to control the calculation circuitry of FIG. 6, etc.) or other control circuitry of a wireless communication device (e.g., base stations or other devices implementing drift sensitive communication systems) as described herein.

Block 950 represents an idle state. For example, the digital phase computation and control circuitry may be in an idle state, with registers used to trigger phase measurements.

Block 952 illustrates a setup state. When the control registers or control circuitry of the wireless device identify a need for a measurement, the operational state changes from the idle state of block 950 to the setup state of block 952 to set any measurement configurations. The operations performed in such a state can be similar to the operations of block 902 above, where error thresholds, targets, and other such setup details are selected. In some implementations, the setup state can include programmable selection of the number of samples per measurement, whether a single measurement, a tracking measurement (e.g., tracking until a phase error is below a selected threshold), or a continuous measurement state is set.

Block 954 represents a calibration initiation state. Once a setup is complete in block 952, the state can proceed to the calibration initiation state, in which any calibration settings associated with selected programmable states from the setup operations of block 952 are performed and set in preparation for operational calculations in later states. The calibration can loop between initialization and calibration run states of block 956 if multiple elements are set. Block 958 represents a calibration completion state once all calibrations associated with setup selections are complete.

Block 960 represents a check or operational state, where measurements are taken. As described above, the check can include different measurements for measurement states selected in the setup state, including continuous, tracking, or single measurement states. The operational state of block 960 can be used to perform the sampling and calculations for phase and phase error values described above (e.g., with respect to FIG. 6 or any other such operations described herein).

Block 962 represents a correction initiation state. The correction initiation state can check measurements (e.g., phase and phase error measurements) for each measurement of phase and phase error against an error threshold. If the phase and phase error values from a measurement taken in block 960 operation are less than the error threshold, the state returns to an idle state. Depending on the overall operational selections from the setup states, the idle state can then wait for anew setup operation (e.g., following a measure once setup or completion of a set of tracking measurements), or can return to the operation state of block 960 for an additional measurement if a tracking measurement state is in process or the setup is in a continuous measurement setup state.

Block 964 represents a correction state. If the correction initiation state of block 962 identifies that a phase error is greater than a phase threshold, then phase correction operations are implemented in phase correction states of blocks 964, 966, and 968. Such operations can involve generation of a control code that is used by delta sigma modulation circuitry to adjust the operation of a PLL (e.g., the TX PLL 292, the RX PLL 282, etc.). Such feedback adjustments take time to propagate through a channel, and so rather than shifting directly from the correction state of block 964 to the idle state of block 950 after the correction operations are identified as complete in the correction completion state of block 968, a delay can be enforced to allow the phase adjustment feedback to be implemented (e.g., via delta sigma modulation circuitry such as circuitry 430) before the states of the correction loop (e.g., states of blocks 962, 964, 966, and 968) complete and the system returns to the idle state of block 950. As described above, the idle state of block 950 can then implement an additional delay before proceeding to an additional subsequent state. Such a subsequent state can be a jump directly to a subsequent phase measurement check of block 960 if continuous or tracking operations are in progress from a previous setup, or a new setup if control instructions for a new setup are received from system control circuitry.

A base station with, for example, a 64×64 MIMO can include a large number of channels for implementing various operations, and can include phase scanning, beamforming, and other such operations where the relative phase between the channels is important to performance. If channels drift over temperature, then performance is degraded and MIMO performance is lost. Examples herein can use the phase tracking and correction for a central PLL frequency which is used for LO generation to distribute a signal to the different MIMO channels to maintain performance. Operations of FIGS. 8 and 9 can be simultaneously implemented for different tracking systems of transmit and receive chains, with the separate phase tracking systems following independent implementations for setup, control, phase tracking, and phase correction as described above.

Figure 10:
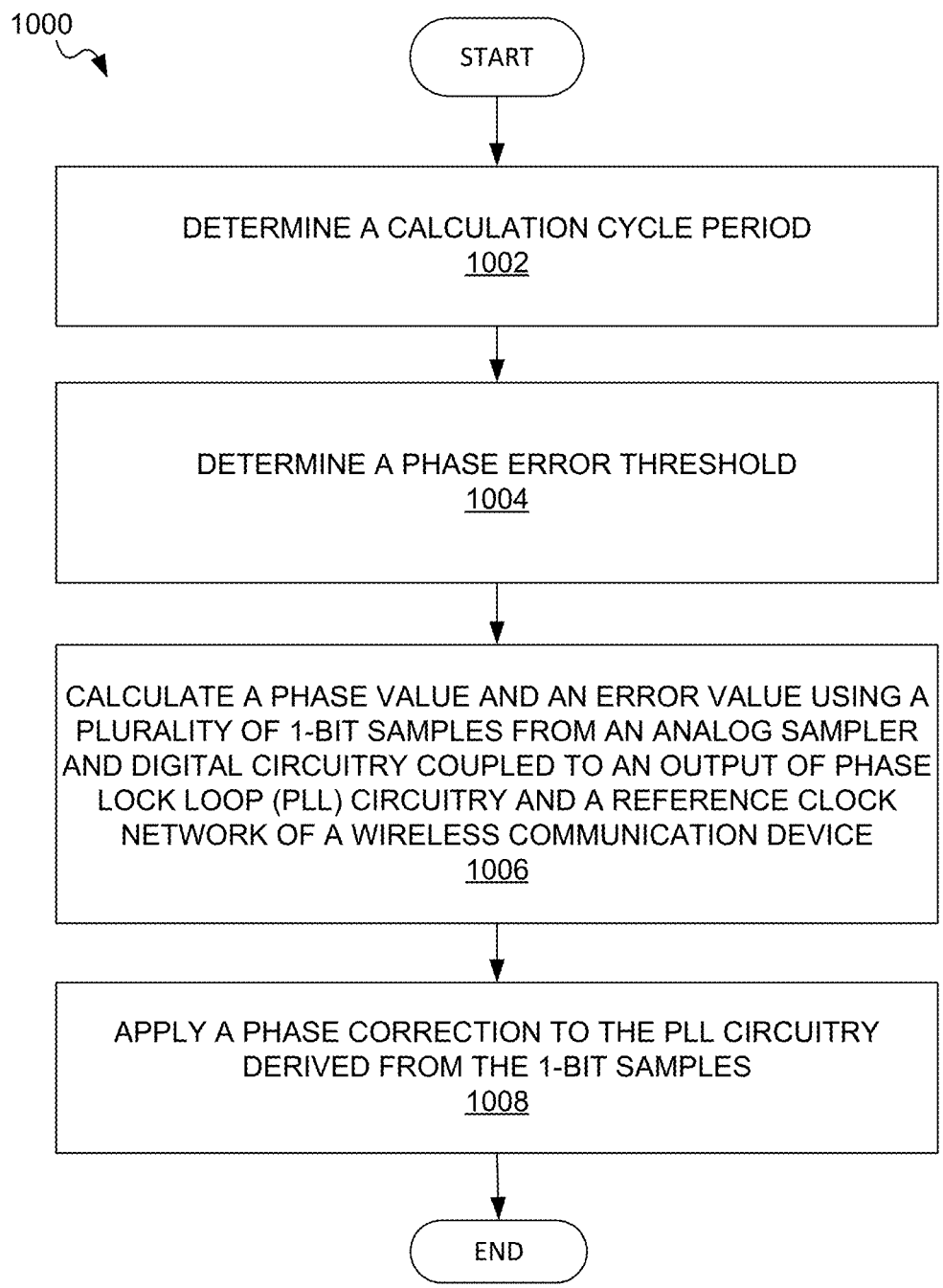
FIG. 10 is a flow diagram illustrating a method in accordance with aspects of the present disclosure.

FIG. 10 is a flow diagram describing an example of the operation of a method 1000 for operation of a device including a sampling architecture for phase detection, correction, and tracking as described herein. The blocks in the method 1000 can be performed in or out of the order shown, and in some embodiments, can be performed at least in part in parallel.

At block 1002 of method 1000, the device (or a component thereof) may perform operations for determining a calculation period. For example, the data processor 210 may make this determination, e.g., based on values in the memory 298.

At block 1004 of method 1000, the device (or a component thereof) may perform operations for determining a phase error threshold. For example, the data processor 210 may make this determination, e.g., based on values in the memory 298.

At block 1006 of method 1000, the device (or a component thereof) may perform operations for calculating a phase value and an error value using a plurality of 1-bit samples from an analog sampler and digital circuitry. This calculation may be based on phase accumulation values from a first phase accumulator and a second phase accumulator. The analog sampler, the first phase accumulator, and the second phase accumulator are coupled to an output of phase lock loop (PLL) circuitry and a reference clock network (e.g., that is configured to provide the reference clock Fr) of a wireless communication device. Block 1006 may be performed, for example, by device elements or components such as 318, 320, 420, 422, 424, 500A, 500B, 600, and/or 700).

At block 1008 of method 1000, the device (or a component thereof) may perform operations for applying a phase correction to the PLL circuitry. For example, the control circuit 320, 424, or 600 may apply a phase correction or cause a phase correction to be applied, for example by adjusting the DSM 430 to change a divide ratio or other divide value (e.g., of the divider 322, 440).

Figure 11:
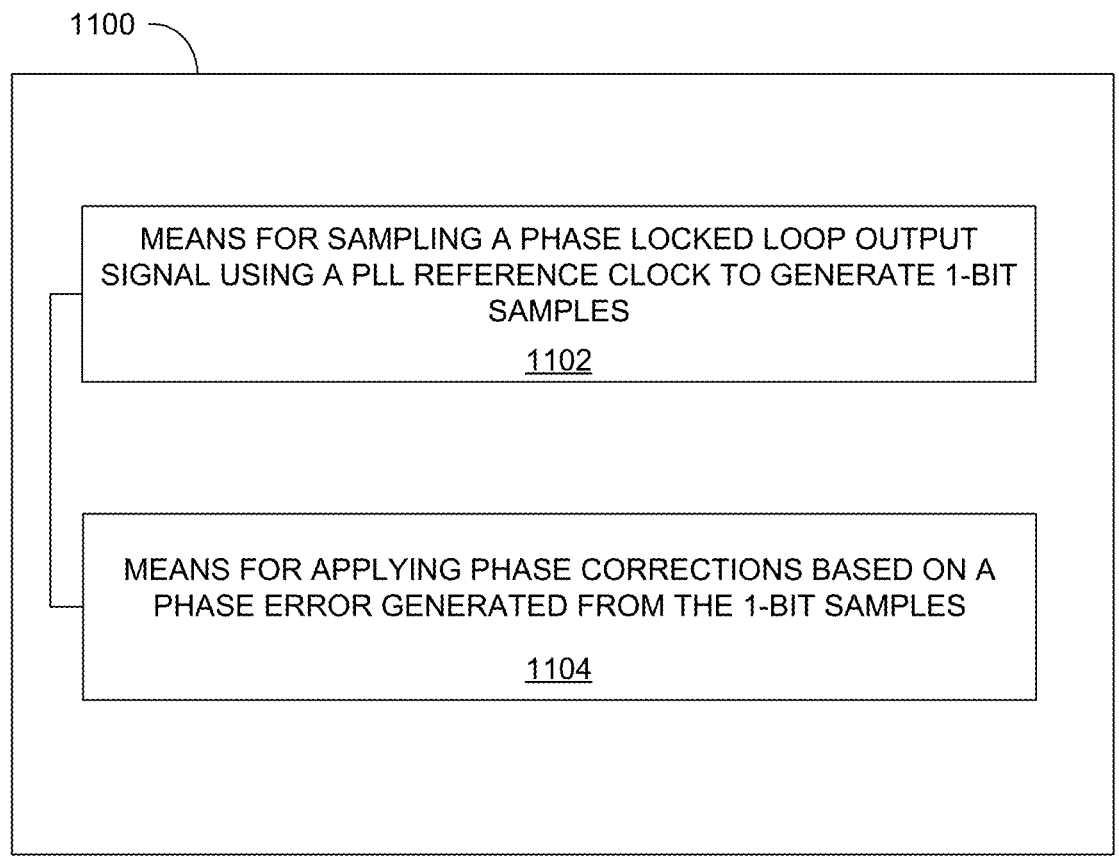
FIG. 11 is a functional block diagram of an apparatus including a 1-bit sampling with digital phase computation and control in accordance with some aspects of the present disclosure.

FIG. 11 is a functional block diagram of an apparatus including a sampling architecture for phase detection, correction, and tracking as described herein. The apparatus 1100 comprises means 1102 for sampling a PLL output signal using a PLL reference clock to generate 1-bit samples. The means 1102 may include 318, 320, 420, 422, 424, 500A, 500B, 600, and/or 700, for example. The apparatus 1100 further comprises means 1104 for applying phase corrections based on a phase error generated from the 1-bit samples (e.g., the 1-bit samples of a calculation, which may vary as described in some aspects above). The means 1104 may include 320, 322, 424, 430, 440, 600, and/or 750, for example.

Figure 12:
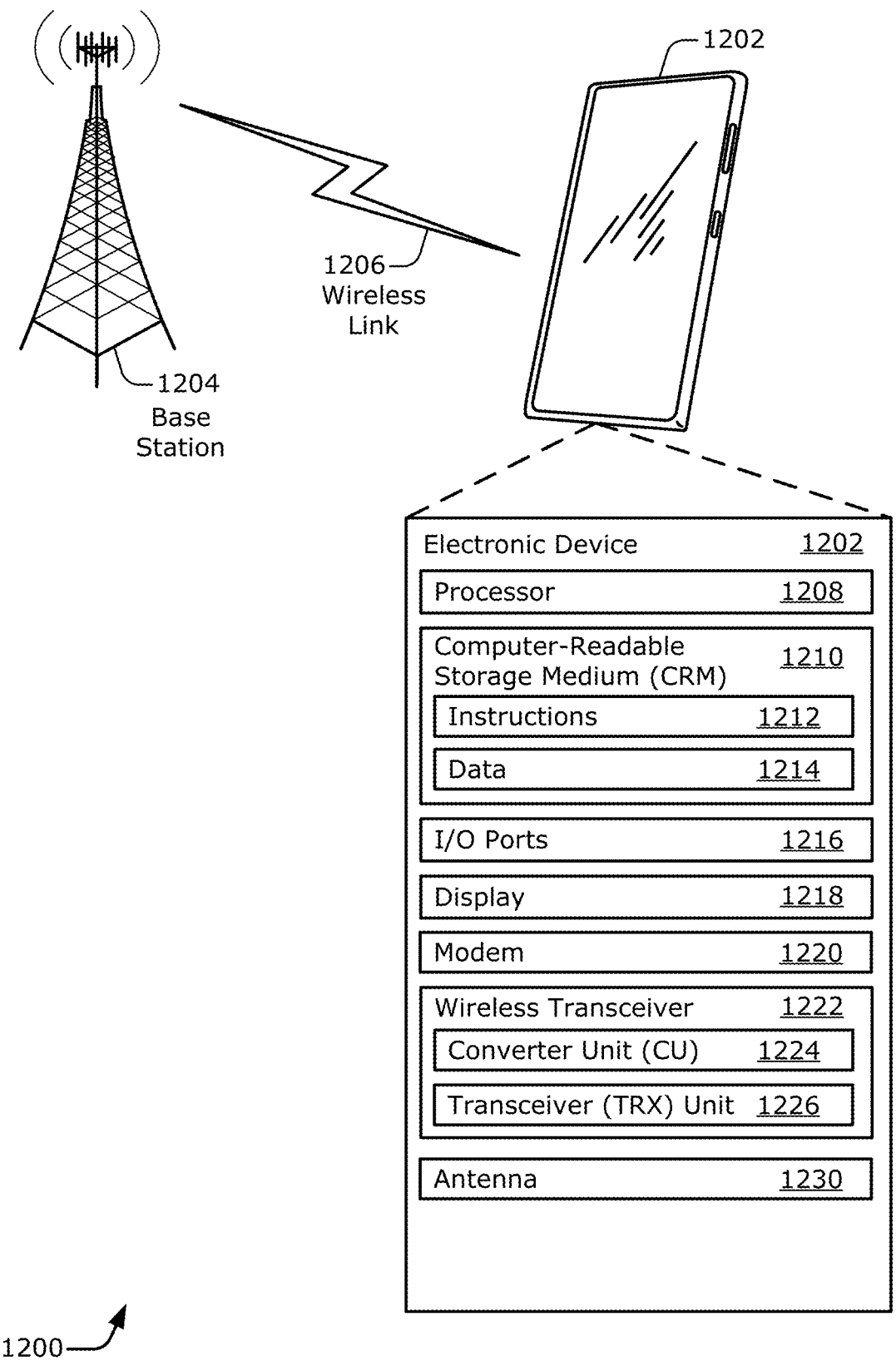
FIG. 12 is a diagram illustrating an environment that includes an electronic device and a base station that can be used with aspects of the present disclosure.

FIG. 12 is a diagram illustrating an exemplary environment 1200 that includes an electronic device 1202 and a base station 1204, each comprising a transceiver (e.g., wireless transceiver 1222 of the electronic device 1202). In the environment 1200, the electronic device 1202 communicates with a base station 1204 through a wireless communication link 1206 (wireless link 1206). In such an example, the electronic device 1202 is depicted as a smart phone. However, the electronic device 1202 may be implemented as any suitable computing or other electronic device, such as a cellular base station, broadband router, access point, cellular or mobile phone, gaming device, navigation device, media device, laptop computer, desktop computer, tablet computer, server, network-attached storage (NAS) device, smart appliance, vehicle-based communication system, Internet-of-Things (IoT) device, and so forth.

The base station 1204 communicates with the electronic device 1202 via the wireless link 1206, which may be implemented as any suitable type of wireless link. Although depicted as a base station tower of a cellular radio network, the base station 1204 may represent or be implemented as another device, such as a satellite, cable television head-end, terrestrial television broadcast tower, access point, peer-to-peer device, mesh network node, router, fiber optic line, another electronic device generally, and so forth. Hence, the electronic device 1202 may communicate with the base station 1204 or another device via a wired connection, a wireless connection, or a combination thereof.

The wireless link 1206 can include a downlink of data or control information communicated from the base station 1204 to the electronic device 1202 and an uplink of other data or control information communicated from the electronic device 1202 to the base station 1204. The wireless link 1206 may be implemented using any suitable communication protocol or standard, such as 3rd Generation Partnership Project Long-Term Evolution (3GPP LTE), 5G New Radio (3GPP 5GNR), IEEE 802.11, IEEE 802.16, Bluetooth™, and so forth.

In accordance with descriptions herein, the base station 1204 may include massive MIMO communication systems for transmitting, receiving, and beamforming signals associated with multiple channels of the wireless link 1206, or for multiple wireless links with multiple electronic devices 1202. Examples herein can use the phase tracking and correction for a central PLL frequency which is used for LO generation (e.g., in the TX PLL 292 or between the TX PLL 292 and the TX LO signal generator 290) to distribute a constant signal to the different MIMO channels to maintain performance.

The electronic device 1202 includes a processor 1208 and a computer-readable storage medium 1210 (CRM 1210). The processor 1208 may include any type of processor, such as an application processor or a multi-core processor, that is configured to execute processor-executable instructions (e.g., code) stored by the CRM 1210. The CRM 1210 may include any suitable type of data storage media, such as volatile memory (e.g., random access memory (RAM)), non-volatile memory (e.g., Flash memory), optical media, magnetic media (e.g., disk or tape), and so forth. In the context of this disclosure, the CRM 1210 is implemented to store instructions 1212, data 1214, and other information of the electronic device 1202, and thus does not include transitory propagating signals or carrier waves.

The electronic device 1202 may also include input/output ports 1216 (I/O ports 1216) or a display 1218. The I/O ports 1216 enable data exchanges or interaction with other devices, networks, or users. The I/O ports 1216 may include serial ports (e.g., universal serial bus (USB) ports), parallel ports, audio ports, infrared (IR) ports, and so forth. The display 1218 can be realized as a screen or projection that presents graphics, e.g. —one or more graphical images, of the electronic device 1202, such as for a user interface associated with an operating system, program, or application. Alternatively, or additionally, the display 1218 may be implemented as a display port or virtual interface through which graphical content of the electronic device 1202 is communicated or presented.

For communication purposes, the electronic device 1202 also includes a modem 1220, a wireless transceiver 1222, and at least one an antenna 1230. The wireless transceiver 1222 provides connectivity to respective networks and other electronic devices connected therewith using RF wireless signals. Additionally, or alternatively, the electronic device 1202 may include a wired transceiver, such as an Ethernet or fiber optic interface for communicating over a personal or local network, an intranet, or the Internet. The wireless transceiver 1222 may facilitate communication over any suitable type of wireless network, such as a wireless local area network (LAN) (WLAN) such as Wi-Fi or Bluetooth, a peer-to-peer (P2P) network, a mesh network, a cellular network (e.g., 3GPP2, 4G LTE, 5G NR, or other cellular network), a wireless wide-area-network (WWAN) (e.g., based on 3GPP2, 4G LTE, 5G NR, etc.), a navigational network (e.g., the Global Positioning System (GPS) of North America or another Satellite Positioning System (SPS)), and/or a wireless personal-area-network (WPAN). In the context of the example environment 1200, the wireless transceiver 1222 enables the electronic device 1202 to communicate with the base station 1204 and networks connected therewith. Other figures referenced herein may pertain to other wireless networks.

The modem 1220, such as a baseband modem, may be implemented as a system on-chip (SoC) that provides a digital communication interface for data, voice, messaging, and other applications of the electronic device 1202. The modem 1220 may also include baseband circuitry to perform high-rate sampling processes that can include analog-to-digital conversion (ADC), digital-to-analog conversion (DAC), gain correction, skew correction, frequency translation, and so forth. The modem 1220 may also include logic to perform in-phase/quadrature (I/Q) operations, such as synthesis, encoding, modulation, demodulation, and decoding. More generally, the modem 1220 may be realized as a digital signal processor (DSP) or a processor that is configured to perform signal processing to support communications via one or more networks. Alternatively, ADC or DAC operations may be performed by a separate component or another illustrated component, such as the wireless transceiver 1222.

The wireless transceiver 1222 can include circuitry, logic, and other hardware for transmitting or receiving a wireless signal for at least one communication frequency band. In operation, the wireless transceiver 1222 can implement at least one radio-frequency transceiver unit to process data and/or signals associated with communicating data of the electronic device 1202 via the antenna 1230. Generally, the wireless transceiver 1222 can include filters, switches, amplifiers, and so forth for routing and processing signals that are transmitted or received via the antenna 1230. Generally, the wireless transceiver 1222 includes multiple transceiver units (e.g., for different wireless protocols such as WLAN versus WWAN or for supporting different frequency bands or frequency band combinations).

The filters, switches, amplifiers, mixers, and so forth of wireless transceiver 1222 can include, in one example, at least one single-ended amplifier, switch circuitry, at least one transformer, at least one differential amplifier, and at least one mixer. In some implementations, the single-ended amplifier, which amplifies a strength of a signal, is coupled to the antenna 1230. Thus, the single-ended amplifier can couple a wireless signal to or from the antenna 1230 in addition to increasing a strength of the signal. In some implementations, the switch circuitry can switchably couple individual transformers or a set of transformers to the single-ended amplifier. The set of transformers provides a physical or electrical separation between the single-ended amplifier and other circuitry of the wireless transceiver 1222. The set of transformers also conditions a signal propagating through the set of transformers. Outputs of a transformer can be coupled to one or more mixers.

Some examples can use a differential amplifier at the output of the transformer before the signal is input to a mixer. In such examples, the differential amplifier, like the single-ended amplifier, reinforces a strength of a propagating signal. The wireless transceiver can further perform frequency conversion using a synthesized signal and the mixer. The mixer may include an upconverter and/or a downconverter that performs frequency conversion in a single conversion step, or through multiple conversion steps. The wireless transceiver 1222 may also include logic (not shown) to perform in-phase/quadrature (I/Q) operations, such as synthesis, encoding, modulation, demodulation, and decoding using a synthesized signal.

In some cases, components of the wireless transceiver 1222 are implemented as separate receiver and transmitter entities. Additionally or alternatively, the wireless transceiver 1222 can be realized using multiple or different sections to implement respective receiving and transmitting operations (e.g., using separate transmit and receive chains). In addition, different wireless protocols such as WWAN and WLAN may be implemented on separate chips or as separate System-on-a-Chips (SoCs). As such, the blocks such as the modem 1220 and transceiver 1222 may represent more than one modem 1220 or transceiver implemented either together on separate chips or separate SoCs.

While the elements 1208-1230 are described above with respect to the device 1202, these components may also be used to implement the base station 1204. In some such examples, circuits described above with respect to FIGS. 3-7, and/or operations described above with respect to FIGS. 8-10, may be implemented in one or more of the processor 1208, modem 1220, and transceiver 1222, and/or based on instructions 1212 and/or data 1214.

An apparatus implementing the circuit described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR) or corresponding mmW elements, (iv) an ASIC such as a mobile station modem (MSM), (v) a module that may be embedded within other devices, (vi) a receiver, cellular phone, wireless device, handset, mobile unit, base station, or access point, (vii) etc.

Figure 13:
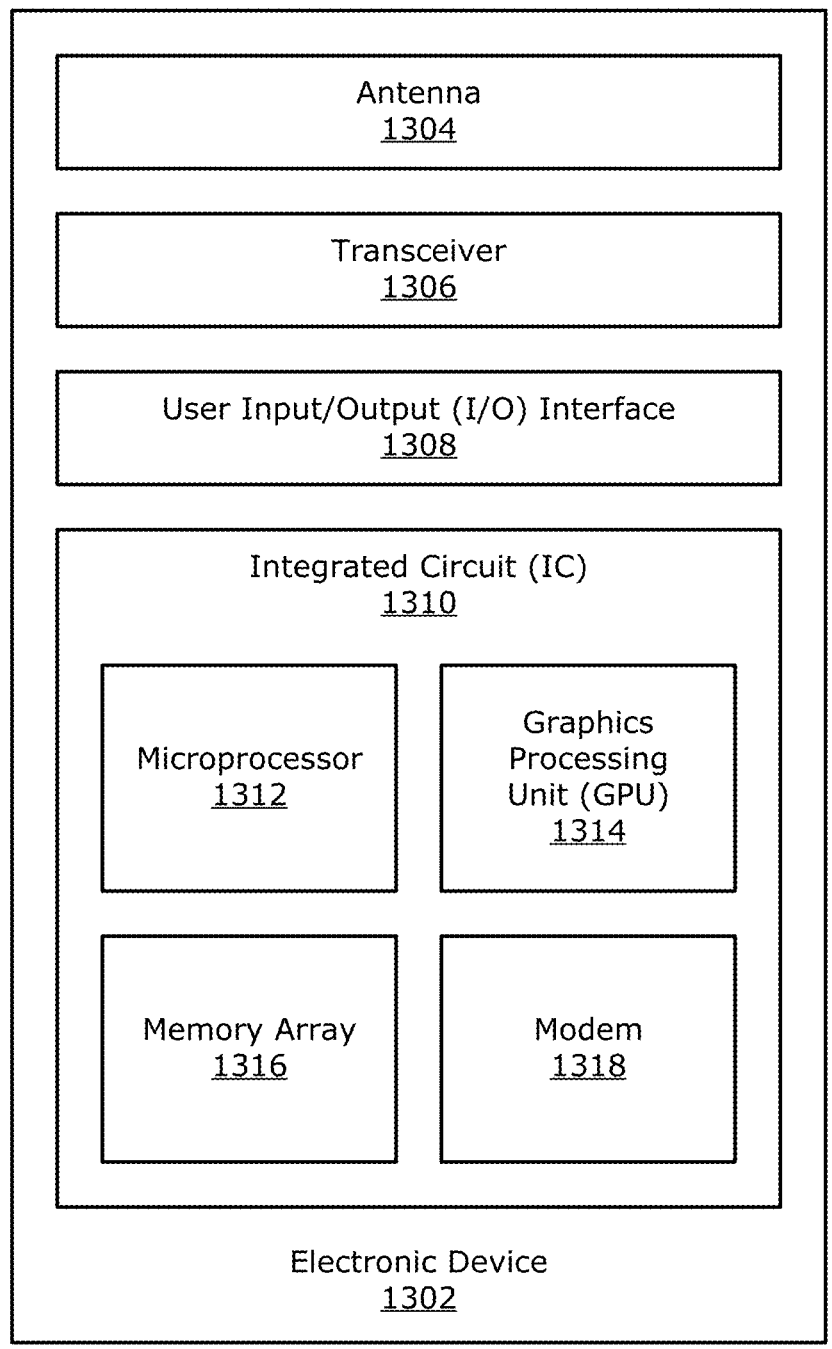
FIG. 13 is a diagram of an electronic device that can be used with aspects of the present disclosure.

FIG. 13 is a diagram illustrating an exemplary electronic device 1302, which includes a transceiver 1306 that can include and/or implement phase tracking and correction in accordance with examples described herein. As shown, the electronic device 1302 includes an antenna 1304, a transceiver 1306, and optionally a user input/output (I/O) interface 1308, in addition to the integrated circuit 1310. Illustrated examples of the integrated circuit 1310, or cores thereof, include a microprocessor 1312, optionally a graphics processing unit (GPU) 1314, a memory array 1316, and a modem 1318. Each component can be operably coupled to another component, such as the GPU 1314 being operably coupled to the user I/O interface 1308.

The electronic device 1302 can be a mobile or battery-powered device or a fixed device that is designed to be powered by an electrical grid. Examples of the electronic device 1302 include a server computer, a network switch or router, a blade of a data center, a base station, an access point, a CPE, a personal computer, a desktop computer, a notebook or laptop computer, a tablet computer, a smart phone, an entertainment appliance, or a wearable electronic device such as a smartwatch, intelligent glasses, or an article of clothing. An electronic device 1302 can also be a device, or a portion thereof, having embedded electronics. Examples of the electronic device 1302 with embedded electronics include a passenger vehicle, industrial equipment, a refrigerator or other home appliance, a drone or other unmanned aerial vehicle (UAV), or a power tool.

For an electronic device with a wireless capability, the electronic device 1302 includes an antenna 1304 that is coupled to a transceiver 1306 to enable reception or transmission of one or more wireless signals. The integrated circuit 1310 may be coupled to the transceiver 1306 to enable the integrated circuit 1310 to have access to received wireless signals or to provide wireless signals for transmission via the antenna 1304. The electronic device 1302 as shown also includes at least one optional user I/O interface 1308. Examples of the user I/O interface 1308 include a keyboard, a mouse, a microphone, a touch-sensitive screen, a camera, an accelerometer, a haptic mechanism, a speaker, a display screen, or a projector. The transceiver 1306 can correspond to, for example, the wireless transceiver 1222 (e.g., of FIG. 12).

The integrated circuit 1310 may comprise, for example, one or more instances of a microprocessor 1312, an optional GPU 1314, a memory array 1316, a modem 1318, and so forth. The microprocessor 1312 may function as a central processing unit (CPU) or other general-purpose processor. Some microprocessors include different parts, such as multiple processing cores, that may be individually powered on or off. The GPU 1314 may be especially adapted to process visual related data for display, such as video data images. If visual-related data is not being rendered or otherwise processed, the GPU 1314 may be fully or partially powered down. The memory array 1316 stores data for the microprocessor 1312 or the GPU 1314. Example types of memory for the memory array 1316 include random access memory (RAM), such as dynamic RAM (DRAM) or static RAM (SRAM); flash memory; and so forth. If programs are not accessing data stored in memory, the memory array 1316 may be powered down overall or block-by-block. The modem 1318 demodulates a signal to extract encoded information or modulates a signal to encode information into the signal. If there is no information to decode from an inbound communication or to encode for an outbound communication, the modem 1318 may be idled to reduce power consumption. The integrated circuit 1310 may include additional or alternative parts than those that are shown, such as an I/O interface, a sensor such as an accelerometer, a transceiver or another part of a receiver chain, a customized or hard-coded processor such as an application-specific integrated circuit (ASIC), and so forth.

The integrated circuit 1310 may also comprise a system on chip (SoC). An SoC may integrate a sufficient number of different types of components to enable the SoC to provide computational functionality as a notebook computer, a mobile phone, a base station, or another electronic apparatus using one chip, at least primarily. Components of an SoC, or an integrated circuit 1310 generally, may be termed cores or circuit blocks. Examples of cores or circuit blocks include, in addition to those that are illustrated in FIG. 13, a voltage regulator, a main memory or cache memory block, a memory controller, a general-purpose processor, a cryptographic processor, a video or image processor, a vector processor, a radio, an interface or communications subsystem, a wireless controller, or a display controller. Any of these cores or circuit blocks, such as a central processing unit or a multimedia processor, may further include multiple internal cores or circuit blocks.

Although selected aspects have been illustrated and described in detail, it will be understood that various substitutions and alterations may be made therein without departing from the spirit and scope of the present invention, as defined by the following claims.

Illustrative aspects of the present disclosure include, but are not limited to:

Aspect 1. A wireless communication apparatus comprising: an analog 1-bit sampler configured to sample a phase locked loop (PLL) output signal using a PLL reference clock to generate 1-bit samples; and a digital phase computation and control circuit configured to receive the 1-bit samples from the analog 1-bit sampler and apply phase corrections to the PLL based on a phase error derived from the 1-bit samples.

Aspect 2. The wireless communication apparatus of Aspect 1, wherein the PLL output signal is sampled within a transmit signal path of the wireless communication apparatus prior to a local oscillator (LO) signal generator circuit.

Aspect 3. The wireless communication apparatus of Aspect 2, wherein the PLL output signal is sampled in a path between a voltage controlled oscillator and the LO signal generator circuit.

Aspect 4. The wireless communication apparatus of Aspect 1, wherein the PLL output signal is sampled from a portion of a receive path between receive PLL circuitry and local oscillator (LO) signal generator circuitry.

Aspect 5. The wireless communication apparatus of any of Aspects 1 to 4, wherein the analog 1-bit sampler comprises: a signal buffer; switch circuitry; a voltage comparator having an input coupled to the signal buffer via the switch circuitry; and a PLL reference clock buffer for the PLL reference clock, the PLL reference clock buffer coupled to the switch circuitry, wherein the PLL reference clock buffer is configured to control the switch circuitry to hold a sample from the PLL output signal at the input at each cycle of the PLL reference clock via the signal buffer.

Aspect 6. The wireless communication apparatus of Aspect 5, wherein the PLL reference clock buffer is further used to control timing of a 1-bit output of the voltage comparator while the sample is held at the input of the voltage comparator.

Aspect 7. The wireless communication apparatus of any of Aspects 1 to 6, further comprising a delay element coupled in a path used to control a timing of the 1-bit output of the voltage comparator.

Aspect 8. The wireless communication apparatus of Aspect 7, wherein the delay element is configured to trigger the voltage comparator following every edge of the PLL reference clock to generate the 1-bit output as a 1 or a 0 signal at an output of the voltage comparator.

Aspect 9A. The wireless communication apparatus of any of Aspects 1 to 8, wherein the analog 1-bit sampler comprises: a signal buffer; a voltage comparator having an input coupled to the signal buffer; and a PLL reference clock buffer for the PLL reference clock, wherein the voltage comparator is coupled to the PLL reference clock buffer to clock the 1-bit samples of a signal from the signal buffer using the PLL reference clock from the PLL reference clock buffer.

Aspect 9B. The wireless communication apparatus of any of Aspects 1 to 8, wherein the analog 1-bit sampler comprises: a signal buffer; a voltage comparator having an input coupled to the signal buffer; and a PLL reference clock buffer for the PLL reference clock, wherein the voltage comparator is coupled to the PLL reference clock buffer and configured to be activated by to clock the 1-bit samples of a signal from the signal buffer using the PLL reference clock from the PLL reference clock buffer to generate the 1-bit samples.

Aspect 10. The wireless communication apparatus of any of Aspects 1 to 9, wherein the digital phase computation and control circuit is configured to calculate a single phase value and the phase error using the 1-bit samples.

Aspect 11. The wireless communication apparatus of any of Aspects 1 to 10, wherein the single phase value is calculated using the 1-bit samples multiplied by corresponding 1-bit quantization phase accumulation values.

Aspect 12. The wireless communication apparatus of any of Aspects 1 to 10, wherein the digital phase computation and control circuit comprises: a first digital phase accumulator; a second digital phase accumulator; and a sample input connected to an output of the analog 1-bit sampler.

Aspect 13. The wireless communication apparatus of Aspect 12, wherein: the single phase value is calculated using values from the first digital phase accumulator when values from the second digital phase accumulator are in a first dead zone associated with a 50% duty cycle state for the first digital phase accumulator; and the single phase value is calculated using the values from the second digital phase accumulator when the values from the first digital phase accumulator are in a second dead zone associated with the 50% duty cycle state for the second digital phase accumulator.

Aspect 14. The wireless communication apparatus of any of Aspects 1 to 10, wherein the digital phase computation and control circuit comprises circuitry configured to: compare the phase error to an error target; and generate a control signal associated with the phase error when the phase error is larger than the error target.

Aspect 15. The wireless communication apparatus of Aspect 14, further comprising: delta sigma modulation circuitry, wherein an output of the digital phase computation and control circuit is coupled to the delta sigma modulation circuitry to provide the control signal to the delta sigma modulation circuitry.

Aspect 16. The wireless communication apparatus of Aspect 14, wherein the control signal is selected to generate a single phase error correction to compensate for the phase error.

Aspect 17. The wireless communication apparatus of Aspect 14, wherein the control signal is selected to generate a partial phase error correction to compensate with for the phase error over multiple subsequent periods of phase error calculations and subsequent phase error correction values.

Aspect 18. The wireless communication apparatus of any of Aspects 1 to 17, wherein: the PLL comprises a PLL output coupled to the analog 1-bit sampler to provide the PLL output signal to a signal buffer of the analog 1-bit sampler.

Aspect 19. The wireless communication apparatus of any of Aspects 1 to 18, further comprising local oscillator (LO) signal generation circuitry coupled to the PLL output and a feedback loop between the PLL output and the LO signal generator to compensate for high frequency phase spikes, wherein the phase corrections applied by the digital phase computation and control circuit compensate for low frequency phase drift.

Aspect 20. The wireless communication apparatus of any of Aspects 1 to 19, further comprising digital divider circuitry, the digital divider circuitry comprising: first input coupled the PLL output; a second input coupled to the digital phase computation and control circuit; and an output configured to provide a feedback clock to an input of the PLL, wherein the feedback clock is selected at least in part by dividing the PLL output signal received from the PLL based on a control signal from the digital phase computation and control circuit in response to the phase error being greater than a threshold value.

Aspect 21. The wireless communication apparatus of Aspect 20, further comprising a delta sigma modulator, wherein the delta sigma modulator is configured to set a divide value of the digital divider circuitry based on the control signal.

Aspect 22. The wireless communication apparatus of any of Aspects 1 to 21, wherein the digital phase computation and control circuit is further configured to monitor the phase error according an operational setup state indicated by processing circuitry of the wireless communication apparatus.

Aspect 23. The wireless communication apparatus of Aspect 22, wherein the operational setup state indicates monitoring for a single computation period in a single measurement state, monitoring until a phase error is less than a threshold error value in a tracking measurement state, and monitoring for repeated computation periods until an interrupt is received in a continuous measurement state.

Aspect 24. A wireless communication apparatus comprising: a signal path; an analog sampler coupled to the signal path at a detection position and configured to generate 1-bit phase samples of a signal on the signal path; phase sample circuitry having an input coupled to the analog sampler and an output that indicates an average phase value over a calculation period; and control circuitry configured to determine a phase error value from the average phase value of the calculation period for each of a plurality of phase accumulators, compare the phase error value to a threshold value, and generate a control signal when the phase error value is greater than the threshold value.

Aspect 25. The wireless communication apparatus of Aspect 24, further comprising: a phase locked loop (PLL) having a control input and a signal output configured to provide the signal to the signal path, wherein the control circuitry is configured to provide the control signal to the control input of the PLL when the phase error value is greater than the threshold value.

Aspect 26. The wireless communication apparatus of any of Aspects 24 to 25, wherein the phase sample circuitry comprises: the plurality of phase accumulators configured to calculate accumulation values corresponding to each bit of the 1-bit phase samples from the analog sampler; and computation circuitry configured to multiply each 1-bit phase sample by corresponding accumulation values from each of the plurality of phase accumulators, and determine the average phase value over the calculation period for each of the plurality of phase accumulators.

Aspect 27. A method comprising: determining a phase error threshold; calculating a phase error value using a plurality of 1-bit samples from an analog sampler and digital circuitry, wherein the analog sampler and digital circuitry are coupled to an output of phase lock loop (PLL) circuitry and a reference clock network of a wireless communication device; and applying a phase correction to the PLL circuitry based on an output of the digital circuitry if the error value is greater than the phase error threshold.

Aspect 28. The method of Aspect 27, further comprising: selecting an operational setup state between a single measurement state, a tracking measurement state, and a continuous measurement state; and calculating corresponding phase error values for a calculation period based on the operational setup state.

Aspect 29. The method of Aspect 28, further comprising selecting a number of 1-bit samples in the calculation period, and selecting a phase error threshold for the operational setup state.

Aspect 30. The method of any of Aspects 27 to 29, wherein the digital circuitry comprises a first phase accumulator and a second phase accumulator, and wherein calculating the phase error value comprises calculating the phase error value based on the plurality of 1-bit samples and phase accumulation values from the first phase accumulator and the second phase accumulator.

Aspect 31: An apparatus comprising means for performing operations according to any of Aspects 1 through 30 above.

Aspect 32: A non-transitory computer-readable storage medium comprising instructions stored thereon which, when executed by one or more processors, cause the one or more processors to implement operations according to any of Aspects 1 through 30 above.

What is claimed is:
1. A wireless communication apparatus comprising:
an analog sampler and 1-bit comparator configured to sample a phase locked loop (PLL) output signal from a PLL using a PLL reference clock to generate 1-bit samples, the PLL comprising a PLL output coupled to the analog sampler and 1-bit comparator to provide the PLL output signal to a signal buffer of the analog sampler and 1-bit comparator, wherein the PLL reference clock is connected to a PLL reference clock buffer of the analog sampler and 1-bit comparator; and a digital phase control circuit configured to receive the 1-bit samples from the analog sampler and 1-bit comparator and apply phase corrections to the PLL based on a phase error derived from the 1-bit samples.

2. The wireless communication apparatus of claim 1, wherein the PLL output signal is sampled from a portion of a transmit path between transmit PLL circuitry and a transmit local oscillator (LO) signal generator circuit.

3. The wireless communication apparatus of claim 2, wherein the PLL output signal is sampled from a portion of a path between a voltage controlled oscillator of the PLL and the transmit LO signal generator circuit.

4. The wireless communication apparatus of claim 1, wherein the PLL output signal is sampled from a portion of a receive path between receive PLL circuitry and a receive local oscillator (LO) signal generator circuit.

5. The wireless communication apparatus of claim 1, wherein the analog sampler and 1-bit comparator comprises:
    switch circuitry; and
    a voltage comparator having an input coupled to the signal buffer via the switch circuitry;
    wherein the PLL reference clock buffer is coupled to the switch circuitry, and wherein the PLL reference clock buffer is configured to control the switch circuitry to hold a sample from the PLL output signal at the input at each cycle of the PLL reference clock via the signal buffer.

6. The wireless communication apparatus of claim 5, wherein the PLL reference clock buffer is further used to control timing of a 1-bit output of the voltage comparator while the sample is held at the input of the voltage comparator.

7. The wireless communication apparatus of claim 6, further comprising a delay element coupled in a path used to control the timing of the 1-bit output of the voltage comparator.

8. The wireless communication apparatus of claim 7, wherein the delay element is configured to trigger the voltage comparator following every edge of the PLL reference clock to generate the 1-bit output as a 1 or a 0 signal at an output of the voltage comparator.

9. The wireless communication apparatus of claim 1, wherein the analog sampler and 1-bit comparator comprises:
    a voltage comparator having an input coupled to the signal buffer;
    wherein the voltage comparator is coupled to the PLL reference clock buffer and configured to be activated by the PLL reference clock from the PLL reference clock buffer to generate the 1-bit samples.

10. The wireless communication apparatus of claim 9, wherein the digital phase control circuit is configured to calculate a single phase value and the phase error using the 1-bit samples.

11. The wireless communication apparatus of claim 10, wherein the single phase value is calculated using the 1-bit samples multiplied by corresponding 1-bit quantization phase accumulation values.

12. The wireless communication apparatus of claim 10, wherein the digital phase control circuit comprises:
    a first digital phase accumulator configured to receive the PLL reference clock;
    a second digital phase accumulator configured to receive the PLL reference clock; and
    a sample input of calculation circuitry connected to an output of the analog sampler and 1-bit comparator and inputs of the first digital phase accumulator and the second digital phase accumulator.

13. The wireless communication apparatus of claim 12, wherein:
    the single phase value is calculated using values from the first digital phase accumulator when values from the second digital phase accumulator are in a first dead zone associated with a duty cycle for the first digital phase accumulator; and
    the single phase value is calculated using the values from the second digital phase accumulator when the values from the first digital phase accumulator are in a second dead zone associated with the duty cycle for the second digital phase accumulator.

14. The wireless communication apparatus of claim 10, wherein the digital phase control circuit comprises calculation circuitry configured to:
    compare the phase error to an error target; and
    generate a control signal associated with the phase error when the phase error is larger than the error target.

15. The wireless communication apparatus of claim 14, further comprising:
    delta sigma modulation circuitry, wherein an output of the digital phase control circuit is coupled to the delta sigma modulation circuitry to provide the control signal to the PLL through the delta sigma modulation circuitry.

16. The wireless communication apparatus of claim 14, wherein the control signal is selected to generate a single phase error correction to compensate for the phase error.

17. The wireless communication apparatus of claim 14, wherein the control signal is selected to generate a partial phase error correction to compensate for the phase error over multiple subsequent periods of phase error calculations and subsequent phase error correction values.

18. The wireless communication apparatus of claim 1, further comprising a transmit local oscillator (LO) signal generator circuit or a receive LO signal generator circuit coupled to the PLL output.

19. The wireless communication apparatus of claim 18, wherein the PLL comprises digital divider circuitry, the digital divider circuitry comprising:
    a first input coupled the PLL output;
    a second input coupled to the digital phase control circuit; and
    an output configured to provide a feedback clock to an input of the PLL, wherein the feedback clock is selected at least in part by dividing the PLL output signal received from the PLL based on a control signal from the digital phase control circuit in response to the phase error being greater than a threshold value.

20. The wireless communication apparatus of claim 19, further comprising:
    a delta sigma modulator, wherein the delta sigma modulator is configured to set a divide value of the digital divider circuitry based on the control signal; and
    a feedback loop coupled between the PLL output and the transmit LO signal generator circuit or the receive LO signal generator circuit to compensate for high frequency phase spikes, wherein the phase corrections applied by the digital phase control circuit compensate for low frequency phase drift.

21. The wireless communication apparatus of claim 1, wherein the digital phase control circuit is further configured to monitor the phase error according to an operational setup state indicated by processing circuitry of the wireless communication apparatus.

22. The wireless communication apparatus of claim 21, wherein the operational setup state indicates monitoring for a single computation period in a single measurement state, monitoring until the phase error is less than a threshold error value in a tracking measurement state, and monitoring for repeated computation periods until an interrupt is received in a continuous measurement state.

23. The wireless communication apparatus of claim 1, wherein the PLL comprises a divider, wherein inputs of the divider are coupled to the digital phase control circuit and the PLL output, and wherein an output of the divider is coupled to a feedback input of the PLL.

24. A method comprising:

determining a phase error threshold;

calculating a phase error value using a plurality of 1-bit samples from a first circuit including an analog phase sample circuitry and a digital control circuitry, wherein the first circuit is coupled to an output of phase lock loop (PLL) circuitry and a reference clock of a wireless communication device, wherein the digital control circuitry comprises a first phase accumulator and a second phase accumulator, and wherein calculating the phase error value comprises calculating the phase error value based on the plurality of 1-bit samples and phase accumulation values from the first phase accumulator and the second phase accumulator; and applying a phase correction to the PLL circuitry based on an output of the digital control circuitry if the phase error value is greater than the phase error threshold.

25. The method of claim 24, wherein determining the phase error threshold comprises:

selecting an operational setup state between among a single measurement state, a tracking measurement state, and a continuous measurement state; and calculating corresponding phase error values for a calculation period based on the operational setup state.

26. The method of claim 25, further comprising selecting a number of 1-bit samples in the calculation period, and selecting the phase error threshold for the operational setup state.

27. A method comprising:

determining a phase error threshold;

calculating a phase error value using a plurality of 1-bit samples from a first circuit including an analog phase sample circuitry and a digital control circuitry, wherein the first circuit is coupled to an output of phase lock loop (PLL) circuitry and a reference clock of a wireless communication device; and applying a phase correction to the PLL circuitry based on an output of the digital control circuitry if the phase error value is greater than the phase error threshold, wherein determining the phase error threshold comprises:

selecting an operational setup state among a single measurement state, a tracking measurement state, and a continuous measurement state; and calculating corresponding phase error values for a calculation period based on the operational setup state.

28. The method of claim 27, further comprising selecting a number of 1-bit samples in the calculation period, and selecting the phase error threshold for the operational setup state.

* * * * *